US012624828B2

(12) United States Patent
Okahisa et al.

(10) Patent No.: US 12,624,828 B2
(45) Date of Patent: **\*May 12, 2026**

(54) LIGHT SOURCE DEVICE

(71) Applicant: NICHIA CORPORATION, Anan (JP)

(72) Inventors: Tsuyoshi Okahisa, Tokushima (JP); Norimasa Yoshida, Komatsushima (JP)

(73) Assignee: NICHIA CORPORATION, Anan (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 19/243,983

(22) Filed: Jun. 20, 2025

(65) Prior Publication Data

US 2025/0314376 A1 Oct. 9, 2025

Related U.S. Application Data

(63) Continuation of application No. 18/903,082, filed on Oct. 1, 2024, now Pat. No. 12,366,354, which is a
(Continued)

(30) Foreign Application Priority Data

| | | |
|---|---|---|
| Jan. 23, 2020 | (JP) | 2020-009419 |
| Feb. 21, 2020 | (JP) | 2020-028323 |
| Sep. 9, 2020 | (JP) | 2020-151304 |

(51) Int. Cl.
*F21V 33/00* (2006.01)
*F21K 9/69* (2016.01)
(Continued)

(52) U.S. Cl.
CPC ............ *F21V 33/0052* (2013.01); *F21K 9/69* (2016.08); *G02B 3/02* (2013.01); *H04N 23/56* (2023.01); *F21Y 2105/10* (2016.08)

(58) Field of Classification Search
CPC . F21V 13/04; F21V 5/00; F21V 5/007; F21V 5/04; F21V 5/008; F21V 7/0066; F21V 7/0091; F21V 33/00; F21Y 105/10
See application file for complete search history.

(56) References Cited

U.S. PATENT DOCUMENTS

| | | |
|---|---|---|
| 10,400,974 B2 | 9/2019 | Kanayama et al. |
| 12,152,769 B2 | 11/2024 | Okahisa et al. |
| (Continued) | | |

FOREIGN PATENT DOCUMENTS

| | | |
|---|---|---|
| CN | 103620299 A | 3/2014 |
| CN | 105814361 A | 7/2016 |
| (Continued) | | |

OTHER PUBLICATIONS

Final Office Action in U.S. Appl. No. 17/153,546 dated Apr. 1, 2024.
(Continued)

*Primary Examiner* — William J Carter
(74) *Attorney, Agent, or Firm* — Foley & Lardner LLP

(57) ABSTRACT

A light source device includes: a plurality of light emitting parts, each having an upper surface that includes a light emitting surface; an optical lens located above the light emitting surfaces of the light emitting parts, the optical lens having: a first surface including a first incident region, and a second surface including a second incident region; and a light converging member located between the light emitting parts and the optical lens, the light converging member including: a light entering portion, corresponding to a first of the plurality of light emitting parts and covering the light emitting surface of the first light emitting part, and a light emission portion, corresponding to the light entering portion. The light converging member includes a first light-reflective member and a unit light converging portion having the light entering portion and the light emission portion.

18 Claims, 26 Drawing Sheets

Related U.S. Application Data continuation of application No. 17/153,546, filed on Jan. 20, 2021, now Pat. No. 12,152,769.

(51) Int. Cl.

| | |
|---|---|
| *F21Y 105/10* | (2016.01) |
| *G02B 3/02* | (2006.01) |
| *H04N 23/56* | (2023.01) |

(56) References Cited

U.S. PATENT DOCUMENTS

| | | | |
|---|---|---|---|
| 12,218,294 B2 | 2/2025 | Okahisa et al. | |
| 12,366,354 B2 | 7/2025 | Okahisa et al. | |
| 2007/0034890 A1 | 2/2007 | Daschner et al. | |
| 2010/0309440 A1 | 12/2010 | Yamagishi et al. | |
| 2013/0069084 A1 | 3/2013 | Daschner et al. | |
| 2013/0135856 A1 | 5/2013 | Arai | |
| 2014/0133142 A1 | 5/2014 | Jørgensen | |
| 2015/0377453 A1 | 12/2015 | Ji et al. | |
| 2016/0312970 A1 | 10/2016 | Suwa et al. | |
| 2016/0351760 A1 | 12/2016 | Hayashi et al. | |
| 2017/0122528 A1* | 5/2017 | Kadoriku | F21S 41/26 |
| 2017/0211770 A1 | 7/2017 | Schmidt et al. | |
| 2017/0241606 A1 | 8/2017 | Courcier et al. | |
| 2018/0245757 A1 | 8/2018 | Kanayama et al. | |
| 2018/0245760 A1 | 8/2018 | Kanayama et al. | |
| 2018/0320852 A1* | 11/2018 | Mandl | F21S 41/151 |
| 2018/0356060 A1 | 12/2018 | Kasano et al. | |
| 2019/0195453 A1 | 6/2019 | Sakamoto et al. | |
| 2019/0312183 A1 | 10/2019 | Hayashi et al. | |
| 2019/0383465 A1 | 12/2019 | Van Der Sijde et al. | |
| 2021/0013385 A1 | 1/2021 | Hayashi et al. | |
| 2021/0102677 A1 | 4/2021 | Courcier et al. | |
| 2021/0231302 A1 | 7/2021 | Okahisa et al. | |

| | | | |
|---|---|---|---|
| 2022/0416134 A1 | 12/2022 | Okahisa et al. | |
| 2025/0020318 A1 | 1/2025 | Okahisa et al. | |
| 2025/0314376 A1 | 10/2025 | Okahisa et al. | |

FOREIGN PATENT DOCUMENTS

| | | |
|---|---|---|
| CN | 106206912 A | 12/2016 |
| CN | 107013863 A | 8/2017 |
| CN | 209587946 U | 11/2019 |
| CN | 209688735 U | 11/2019 |
| JP | 2000-338557 A | 12/2000 |
| JP | 2004-193049 A | 7/2004 |
| JP | 2007-049172 A | 2/2007 |
| JP | 2009-251559 A | 10/2009 |
| JP | 2010-282114 A | 12/2010 |
| JP | 2012-079460 A | 4/2012 |
| JP | 2012-164626 A | 8/2012 |
| JP | 2013-114965 A | 6/2013 |
| JP | 2013-130835 A | 7/2013 |
| JP | 5275557 B2 | 8/2013 |
| JP | 2015-088410 A | 5/2015 |
| JP | 2015-090772 A | 5/2015 |
| JP | 2017-162799 A | 9/2017 |
| JP | 2018-142437 A | 9/2018 |
| JP | 2018-142595 A | 9/2018 |
| JP | 2018-206709 A | 12/2018 |
| JP | 2019-114425 A | 7/2019 |
| JP | 2019-160780 A | 9/2019 |
| JP | 7636657 B2 | 2/2025 |
| WO | WO-2015/198527 A1 | 12/2015 |
| WO | WO-2018/130467 A1 | 7/2018 |

OTHER PUBLICATIONS

Non-Final Office Action in U.S. Appl. No. 17/153,546 dated Oct. 2, 2023.

* cited by examiner

LIGHT SOURCE DEVICE

CROSS-REFERENCE TO RELATED APPLICATIONS

This application is a continuation of U.S. patent application Ser. No. 18/903,082, filed on Oct. 1, 2024, which is a continuation of U.S. patent application Ser. No. 17/153,546, filed on Jan. 20, 2021 (now U.S. Pat. No. 12,152,769), which claims priority to Japanese Patent Application No. 2020-151304, filed on Sep. 9, 2020, Japanese Patent Application No. 2020-028323, filed on Feb. 21, 2020, and Japanese Patent Application No. 2020-009419, filed on Jan. 23, 2020. The entire contents of these application are hereby incorporated by reference.

BACKGROUND

The present disclosure relates to a light source device.

Recently, light sources including a plurality of light emitting parts, such as light emitting diodes, have been used widely. For example, JP 5275557 B1 describes a light source that can be used for a flash in a small camera, such as a camera incorporated in a mobile phone.

SUMMARY

Such a light source for use in, for example, a flash for a camera, must irradiate a desired irradiation region with a sufficient amount of light, among individual irradiation regions demarcated from the whole irradiation area.

In view of this, one object of the present disclosure is to provide a light source device that can irradiate a desired irradiation region with a sufficient amount of light.

A light source device according to one embodiment of the present disclosure includes: a plurality of light emitting parts, each having an upper surface and a light emitting surface on the upper surface; an optical lens located above the light emitting surfaces of the light emitting parts, the optical lens having: a first surface located on a light emitting surface side of the light emitting part, the first surface including a plurality of incident regions each corresponding to a respective one of the plurality of light emitting parts such that a light emitted from each of the light emitting parts is incident on a respective one of the plurality of incident regions, and a second surface opposite to the first surface, the second surface including a plurality of emission regions each corresponding to a respective one of the plurality of incident regions; and a light converging member located between the light emitting parts and the optical lens, the light converging member including: a plurality of light entering portions, each of the plurality of light entering portions corresponding to a respective one of a plurality of light emitting parts and covering the light emitting surface of the respective one of the light emitting parts, and a plurality of light emission portions, each of the plurality of light emission portions corresponding to a respective one of the plurality of light entering portions and having an area smaller than an area of the respective one of the plurality of light entering portions, such that two or more irradiation regions are irradiated with lights emitted from corresponding two or more of the plurality of light emitting parts.

A light source device according to another embodiment of the present disclosure includes: a plurality of light emitting parts, each having a light emitting surface on an upper surface thereof; an optical lens located above the light emitting surfaces of the light emitting parts, the optical lens having: a first surface including a first incident region, and a second surface including a first emission region; and a light converging member located between the light emitting parts and the optical lens, the light converging member including: a plurality of light entering portions, each of the plurality of light entering portions corresponding to a respective one of the plurality of light emitting parts and covering the light emitting surface of the respective one of the light emitting parts, and a plurality of light emission portions, each of the plurality of light emission portions corresponding to a respective one of the plurality of light entering portions and having an area smaller than an area of the respective one of the plurality of light entering portions, such that two or more irradiation regions are irradiated with lights emitted from corresponding two or more of the plurality of light emitting parts.

The light source device according to certain embodiments of the present disclosure can irradiate the desired irradiation region with a sufficient amount of light.

DETAILED DESCRIPTION

Figure 1:
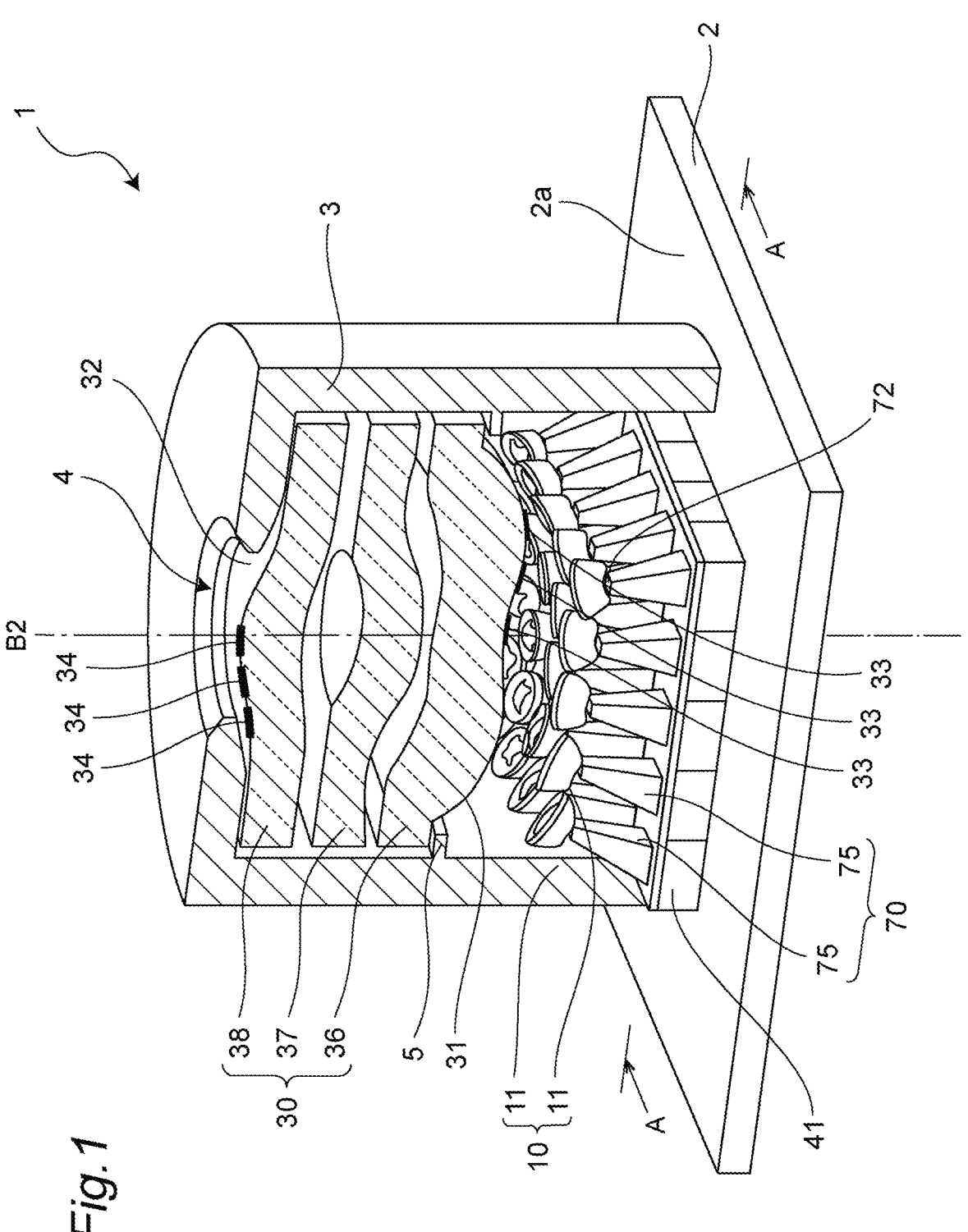
FIG. 1 is a schematic perspective view of a light source for a flash according to a first embodiment of the present disclosure.

Hereinafter, embodiments and examples according to the present disclosure will be described below with reference to the drawings. A light source for a flash described below, which is an example of a light source device according to the present disclosure, is intended to embody the technical ideas of the invention according to the present disclosure. However, the scope of the invention is not limited to the described embodiments and examples unless otherwise specified.

In the drawings, members having an identical function may be denoted by an identical reference character. In consideration of ease of explanation or understanding of the gist of the present invention, a plurality of embodiments or examples will be described for convenience, and configurations described in different embodiments or examples can be partially interchanged or combined. In the embodiments and examples that will be described below, repeated descriptions of previously described elements may be omitted, and only the differences may be described. In particular, similar operations and similar effects obtained from similar configurations will not be described for each embodiment or example. In the drawings, the sizes and positional relationships among members may be exaggerated for the sake of clarity.

In a light source, for example, for a camera flash, the greater the number of individual irradiation regions into which the whole irradiation area is demarcated, the more finely an irradiation region irradiated with light and an irradiation region not irradiated with light can be distinguished from each other, which allows for obtaining a photograph showing a subject more clearly.

However, when the number of divisions is increased to divide the whole irradiation area into detailed irradiation regions, the area of each individual irradiation region is reduced, so that light emitted from each light emitting part is not easily condensed on a desired irradiation region using an optical lens (for example, a camera lens), resulting in difficulty in irradiating the desired irradiation region with a sufficient amount of light. The inventors have made intensive studies to solve this problem.

As a result, the inventors have found that:

(1) collecting lights emitted from light emitting parts allows for increasing the amount of light per unit area, which allows for increasing the luminance of light with which a desired irradiation area is irradiated;

(2) Using an additional lens (first lens) in addition to the optical lens allows for narrowing the full-width half-maximum (directional full-width half-maximum) of the light emitted from each light emitting part described above in (1), causing the light incident on the optical lens to have a predetermined directivity, so that the desired irradiation region can be irradiated with a sufficient amount of light.

A light source device according to an embodiment of the present disclosure has been made in view of the findings described above, so as to irradiate two or more irradiation regions with light. The light source device includes: a plurality of light emitting parts, each having an upper surface and a light emitting surface on the upper surface; an optical lens located above the light emitting surfaces of the light emitting parts, the optical lens having: a first surface located on a light emitting surface side of the light emitting part, the first surface including a plurality of incident regions each corresponding to a respective one of the plurality of light emitting parts such that a light emitted from each of the light emitting parts is incident on a respective one of the plurality of incident regions, and a second surface opposite to the first surface, the second surface including a plurality of emission regions each corresponding to a respective one of the plurality of incident regions; and a light converging member located between the light emitting parts and the optical lens, the light converging member including: a plurality of light entering portions, each of the plurality of light entering portions corresponding to a respective one of a plurality of light emitting parts and covering the light emitting surface of the respective one of the light emitting parts, and a plurality of light emission portions, each of the plurality of light emission portions corresponding to a respective one of the plurality of light entering portions and having an area smaller than an area of the respective one of the plurality of light entering portions, such that two or more irradiation regions are irradiated with lights emitted from corresponding two or more of the plurality of light emitting parts.

A light source device according to another embodiment of the present disclosure has been made in view of the findings described above, so as to irradiate two or more irradiation regions with light. The light source device includes: a plurality of light emitting parts, each having a light emitting surface on an upper surface thereof; an optical lens located above the light emitting surfaces of the light emitting parts, the optical lens having: a first surface including a first incident region, and a second surface including a first emission region; and a light converging member located between the light emitting parts and the optical lens, the light converging member including: a plurality of light entering portions, each of the plurality of light entering portions corresponding to a respective one of the plurality of light emitting parts and covering the light emitting surface of the respective one of the light emitting parts, and a plurality of light emission portions, each of the plurality of light emission portions corresponding to a respective one of the plurality of light entering portions and having an area smaller than an area of the respective one of the plurality of light entering portions, such that two or more irradiation regions are irradiated with lights emitted from corresponding two or more of the plurality of light emitting parts.

EMBODIMENTS

1. First Embodiment

Hereinafter, a light source for a flash will be described as an example of a light source device according to the present disclosure, with reference to the drawings.

Figure 4A:
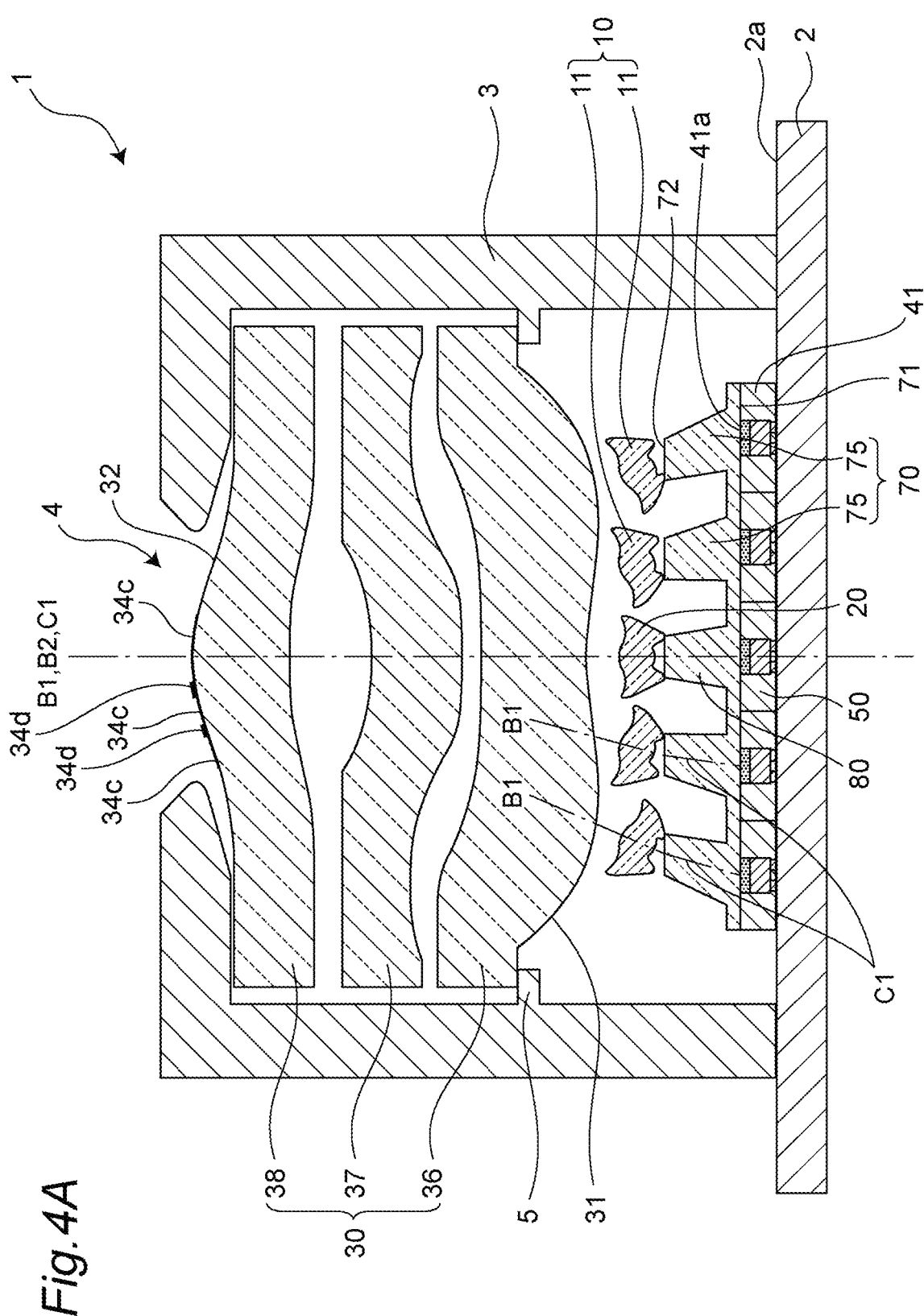
FIG. 4A is a schematic cross-sectional view taken along line A-A of the light source for a flash shown in FIG. 1.

A light source 1 according to the present embodiment is a light source for irradiating two or more irradiation regions with light emitted from light emitting parts. The irradiation region is a region that is expanded radially outwardly with respect to a predetermined direction. In the present embodiment, two or more irradiation regions refer to individual regions whose centers are spaced apart from each other by a predetermined distance when two or more light emitting parts are individually turned on, and that have a predetermined size and are individually irradiated with light emitted from the respective light emitting parts. That is, the expression "two or more irradiation regions" does not refer to a single region irradiated with lights emitted from two or more light emitting parts, but refers to a plurality of regions individually irradiated with lights emitted from respective two or more light emitting parts. The light source 1 according to the present embodiment is provided with a plurality of light emitting parts corresponding to a plurality of irradiation regions onto which lights in different directions are to be irradiated, as will be described below. Thus, by selecting and turning on one or more of the plurality of light emitting parts, one or more desired irradiation regions can be irradiated with the light. As shown in FIGS. 1 and 4A, the light source 1 includes a substrate 2, twenty-five light emitting parts 41, a light converging member 70, a first lens 10, and an optical lens 30. The optical lens 30 collects or projects the light emitted from light emitting parts 41 toward corresponding irradiation regions.

The twenty-five light emitting parts 41 are arranged on an upper surface 2a of the substrate 2.

The light converging member 70 includes twenty-five unit light converging portions 75. Each unit light converging portion 75 includes a light entering portion 71 corresponding to a respective one of the light emitting parts 41 and covering a light emitting surface 41a of the respective light emitting part 41, and a light emission portion 72 corresponding to the light entering portion 71 and having an area smaller than an area of the light entering portion 71.

The first lens 10 includes twenty-five first unit lenses 11, each first unit lens 11 corresponding to a respective one of the unit light converging portions 75 and covering the light emission portion 72 of the respective unit light converging portion 75.

The optical lens 30 is disposed above the light emitting surfaces 41a of the light emitting parts 41. The optical lens 30 has a first surface 31 at the light emitting surface 41a side of the light emitting part 41, and a second surface 32 opposite to the first surface 31. The first surface 31 includes a plurality of incident regions 33 each corresponding to a respective one of the light emitting parts 41 and onto each of which the light emitted from the respective light emitting part 41 is incident. The second surface 32 includes a plurality of emission regions 34 each corresponding to a respective one of the incident regions 33. The incident region 33 and the emission region 34 shown in the figure are exaggeratedly depicted to indicate the regions.

Light emitted from each of the light emitting parts 41 enters the optical lens 30 through the light converging member 70 and the first lens 10, is then emitted from the optical lens 30, and is irradiated to a corresponding one of irradiation regions that correspond to respective light emitting parts 41.

In the present embodiment, a frame 3 that accommodates the twenty-five light emitting parts 41, the light converging member 70, the first lens 10, and the optical lens 30 is disposed on the upper surface 2a of the substrate 2.

For easy understanding of an internal structure of the light source 1, FIG. 1 shows the cross sections of the optical lens 30 and the frame 3 without illustration of portions of the optical lens 30 and portions of the frame 3.

As used herein, for example, the expression that the first unit lens 11 "corresponds to" the light emitting part 41 means that a single unit light converging portion 75 is provided in a one-to-one relationship with a single light emitting part 41 so that a light emitted from a light emitting part 41 enters a corresponding unit light converging portion 75 through the light entering portion 71 and is then emitted from the light emission portion 72 toward the optical lens 30 or a corresponding first unit lens 11. Also, for example, the emission region 34 "corresponding to" the incident region 33 refers to a region where light entering the optical lens 30 from a single incident region 33 is emitted to the outside of the optical lens 30, in other words, a region provided in a one-to-one relationship with the single incident region 33. Further, for example, the irradiation region "corresponding to" the light emitting part 41 refers to a region that is to be irradiated with the light emitted from a single light emitting part 41 and is provided in a one-to-one relationship with the single light emitting part 41.

Thus, the term "corresponding to" herein means the relationship between members, between regions, between a member and a region, and the like, that are associated with each other.

Arrangement of Light Emitting Parts

Figure 2A:
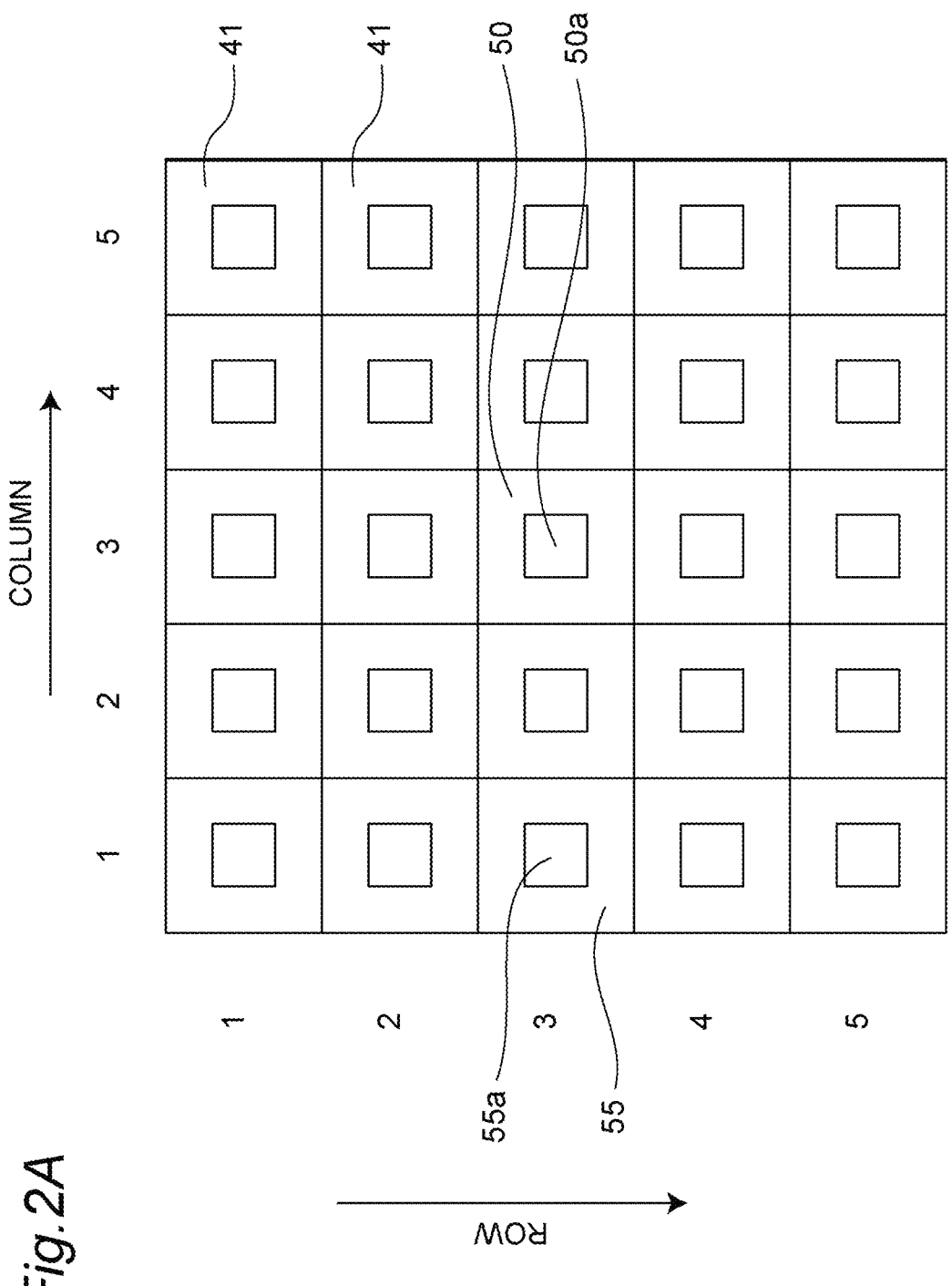
FIG. 2A is a schematic top view for explaining the arrangement of light emitting parts in the light source for a flash shown in FIG. 1.
Figure 2B:
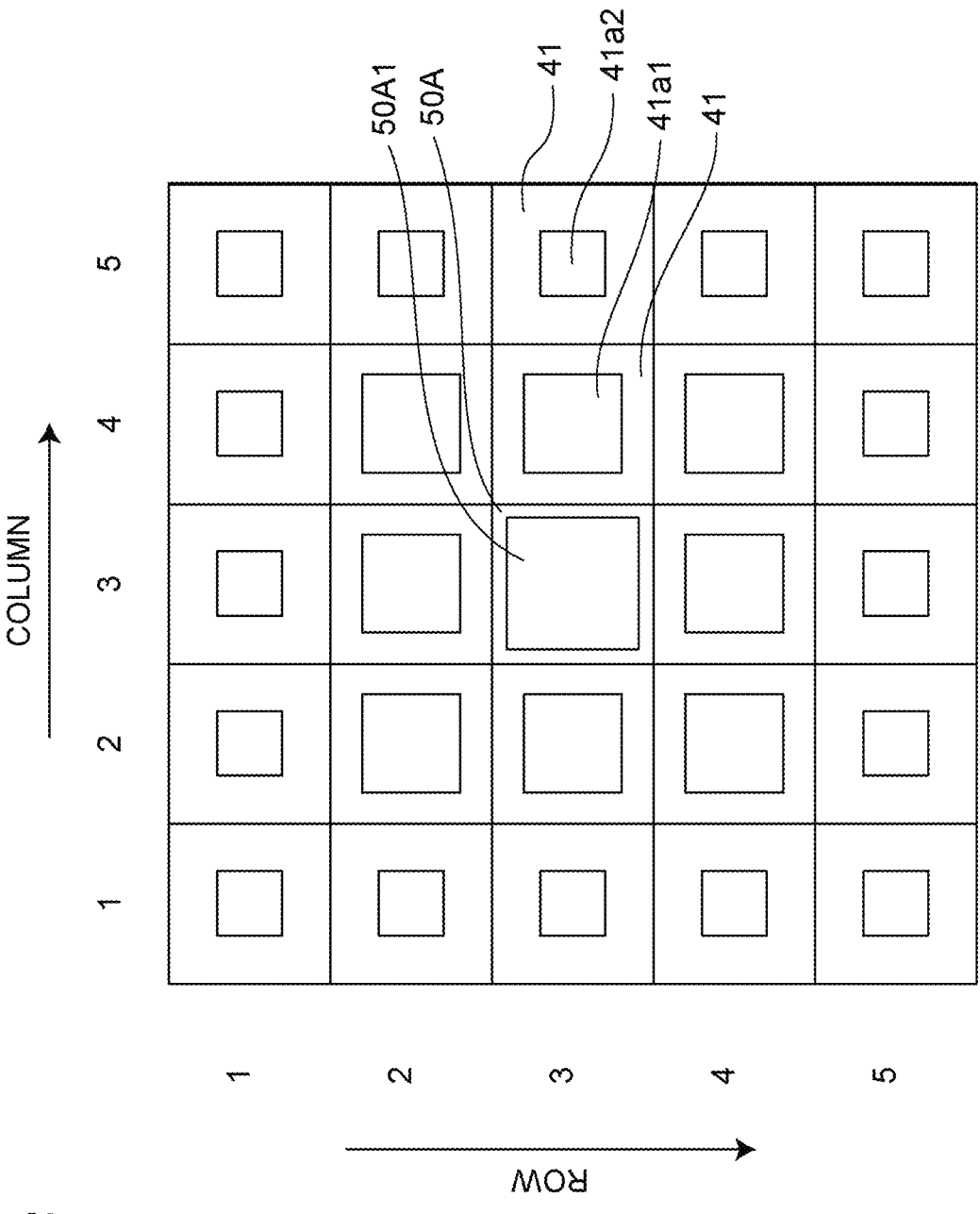
FIG. 2B is a schematic top view of light emitting parts when the light emitting parts have light emitting surfaces with different sizes in the light source for a flash shown in FIG. 1.
Figure 2C:
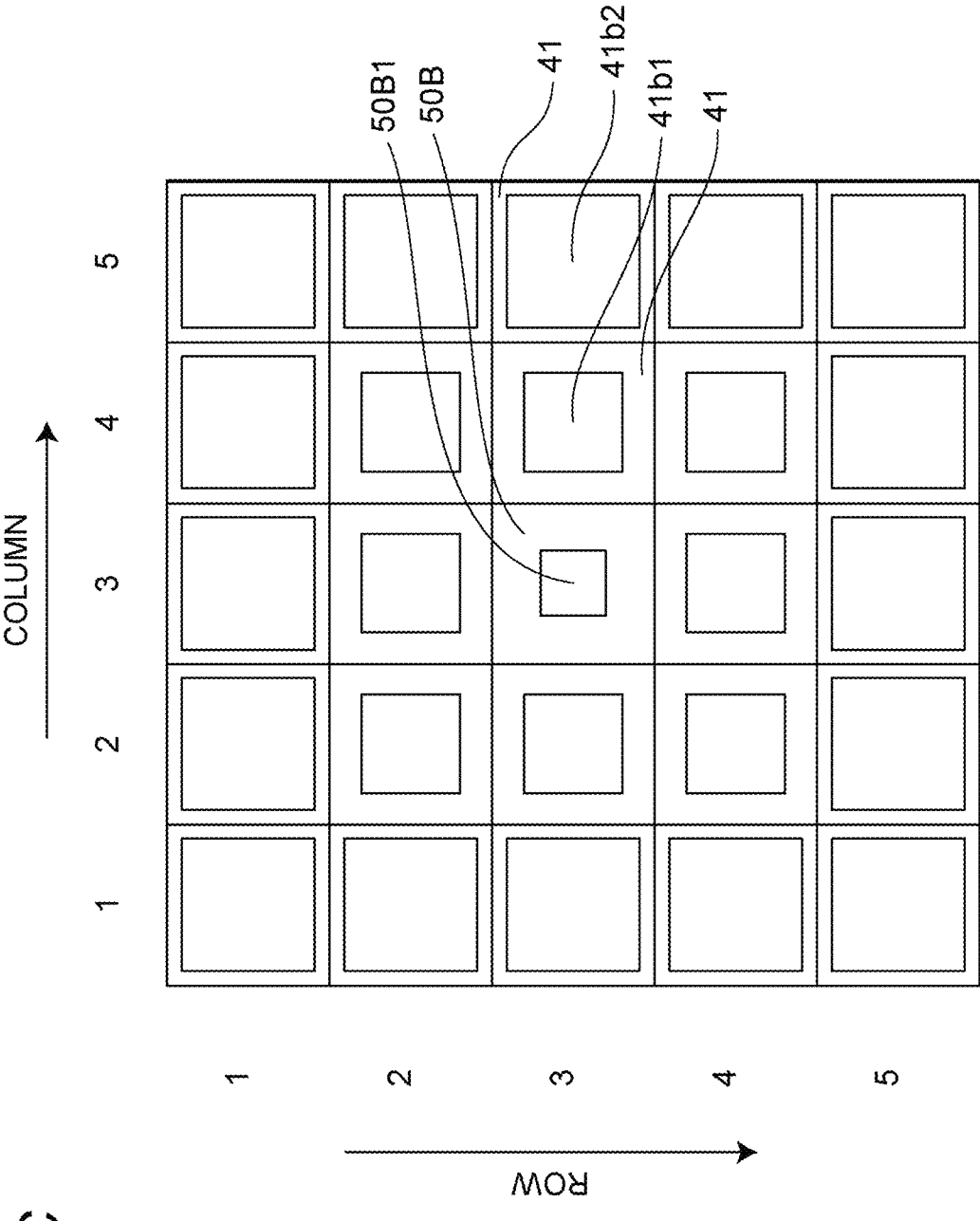
FIG. 2C is a schematic top view of light emitting parts when the light emitting parts have light emitting surfaces with different sizes in the light source for a flash shown in FIG. 1.

As shown in FIG. 2A, the twenty-five light emitting parts 41 are arranged in a matrix of five rows and five columns. The light emitting part located at the center of the twenty-five light emitting parts 41 is a central light emitting part 50 arranged in the third row and the third column. In the present embodiment, each light emitting part 41 (including the central light emitting part 50) has a square shape in a top view, and adjacent light emitting parts 41 are disposed in contact with each other. The light emitting parts 41 may be in other appropriate shapes and arrangements. The light emitting part 41 may have a shape that is, for example, rectangular, circular, polygonal, etc., in a top view. For example, adjacent light emitting parts 41 may be disposed apart from each other. The light emitting surfaces 41*a* of the light emitting parts 41 may have similar shapes in the top view. For example, as shown in FIG. 2B, the size of the light emitting surfaces may be gradually reduced, like the light emitting surfaces 50A1, 41*a*1, and 41*a*2 in FIG. 2B, as the distance from a central light emitting part 50A increases. Alternatively, for example, as shown in FIG. 2C, the size of the light emitting surfaces may be gradually increased, for example, like the light emitting surfaces 50B1, 41*bl*, and 41*b*2 in FIG. 2C, as the distance from a central light emitting part 50B increases. That is, the size of the light emitting surface 41*a* of each light emitting part 41 may vary according to the location of the light emitting part 41 in the matrix arrangement. The farther the light emitting part 41 is disposed from the optical axis of the optical lens 30, the longer the distance to the corresponding irradiation region, the more difficult to control the light distribution, and the greater the loss of light tends to be. For this reason, with an arrangement in which the farther the light emitting part 41 is located from the central light emitting part 50B, the larger the light emitting surface of the light emitting part 41, for example, as in the light emitting surfaces 41*b*1 and 41*b*2 shown in FIG. 2C, the amount of light in the light emitting part 41 located far from the central light emitting part 50B can be increased, reducing the reduction in the brightness.

Furthermore, the number of light emitting parts 41 may be other than twenty-five, and it is sufficient to employ two or more light emitting parts 41. The arrangement of the plurality of light emitting parts 41 may be other than a matrix of m rows and m columns (m≥2), and, for example, may be a matrix of m rows and n columns (m≥1, n≥2, m≠n), or may be a non-matrix arrangement. For example, four light emitting parts 41 are arranged in two rows and two columns, twelve additional light emitting parts 41 may be arranged around the four light emitting parts 41 on four sides to form a matrix such that four light emitting parts of the twelve additional light emitting parts 41 are disposed on each side of the four sides, and eight further additional light emitting parts 41 may be disposed around the twelve additional light emitting parts 41 on four sides such that two light emitting parts are disposed on each side of the four sides except for corners of the matrix. Thus, the plurality of light emitting parts 41 can be arranged in a shape close to a circle in a plan view. With such an arrangement of the plurality of light emitting parts 41, using the optical lens 30 having a circular shape in a plan view allows the lights from the plurality of light emitting parts 41 to be efficiently incident onto the optical lens 30. The number of central light emitting parts may be greater than or equal to two depending on the number of the light emitting parts 41 and/or the arrangement of the light emitting parts 41. The distance between adjacent light emitting parts 41 or between adjacent light emitting surfaces 41*a* may be varied. That is, the distance between the two light emitting parts 41 or two light emitting surfaces 41*a* adjacent in the row direction may be shorter than the distance between the two light emitting parts 41 or the two light emitting surfaces 41*a* adjacent in the column direction.

Arrangement of Irradiation Regions

Figure 3:
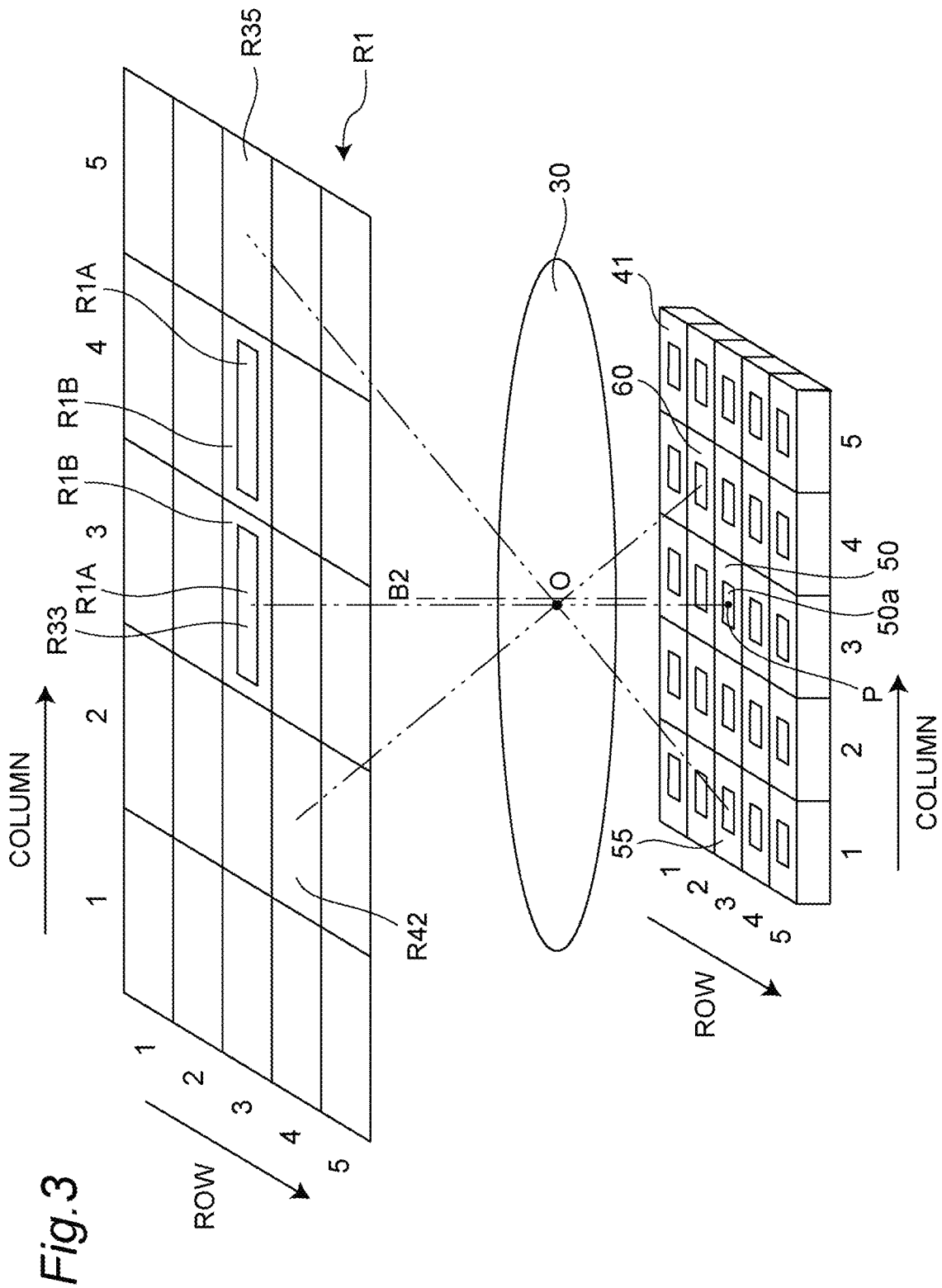
FIG. 3 is a schematic diagram for explaining the relationship between the light emitting part of the light source for a flash shown in FIG. 1 and an irradiation region corresponding to the light emitting part.

As shown in FIG. 3, the light source 1 according to the present embodiment is configured to irradiate light to an area R1, which is divided into twenty-five irradiation regions. The area R1 and each irradiation region shown in the drawings are schematically depicted two-dimensionally for ease of understanding of the contents of the invention. The twenty-five irradiation regions are arranged in a matrix with five rows and five columns. A single irradiation region corresponds to a single light emitting part 41 and is irradiated with light emitted from the corresponding light emitting part 41.

While the twenty-five irradiation regions are arranged in a matrix in the present embodiment, the irradiation regions may be arranged in any other appropriate arrangement. For example, any appropriate number of irradiation regions may be provided as long as two or more irradiation regions are provided. The number of irradiation regions is desirably the same as the number of light emitting parts 41. Furthermore, the arrangement of the plurality of irradiation regions may be other than a matrix of i rows and i columns (i≥2). The plurality of irradiation regions may be arranged in a matrix of i rows and j columns (i≥1, j≥2, i≠j) or may be in a non-matrix arrangement. The arrangement of the irradiation regions is desirably the same as the arrangement of the light emitting parts 41.

Arrangement Relationship Between Light Emitting Part and Irradiation Region

In the present embodiment, as shown in FIG. 3, each light emitting part 41 and its corresponding irradiation region are arranged in a point-symmetric arrangement relationship with respect to a single point O located directly above a midpoint P of a light emitting surface 50*a* of the central light emitting part 50. That is, each light emitting part 41 and a respective one of the irradiation regions, each of the irradiation regions being to be irradiated with a light emitted from a respective one of the light emitting parts, have the point-symmetric arrangement relationship with respect to a single predetermined point for the corresponding light emitting part 41, such that the plurality of light emitting parts 41 and respective corresponding irradiation regions are in the point-symmetric arrangement relationship with respect to the same single predetermined point (the single point O). For example, the irradiation region R33, which is disposed in the third row and third column among the twenty-five irradiation regions, is the irradiation region corresponding to a central light emitting part 50 disposed in the third row and third column among the twenty-five light emitting parts 41. For example, the irradiation region R35, which is disposed in the third row and fifth column among the twenty-five irradiation regions, is the irradiation region corresponding to a light emitting part 55 disposed in the third row and first column among the twenty-five light emitting parts 41. For example, an irradiation region R42, which is disposed in the fourth row and second column among the twenty-five irradiation regions, is the irradiation region corresponding to a light emitting part 60 disposed in the second row and fourth column among the twenty-five light emitting parts 41.

As has been described above, the light emitting part 41 and the corresponding irradiation region are provided in a one-to-one relationship, which is not intended to include only a configuration in which light emitted from a single light emitting part 41 is irradiated to only the corresponding irradiation region. The "irradiation region corresponding to the light emitting part 41" refers to an irradiation region that is a target to which light emitted from the light emitting part 41 is to be irradiated. Therefore, actually, an irradiation region adjacent to (or near) the irradiation region corresponding to a single light emitting part 41 can also be irradiated with the light emitted from the single light emitting part 41. In other words, as shown in FIG. 3, a single irradiation region may include a region (first irradiation region) R1A that is irradiated only with the light emitted from a corresponding light emitting part 41, and a region (second irradiation region) R1B that is irradiated with the light emitted from the corresponding light emitting part 41 and light emitted from a light emitting part 41 adjacent to (and/or near) the corresponding light emitting part 41. The single irradiation region may not include the first irradiation region R1A but may include only the second irradiation region R1B.

Each light emitting part 41 and its corresponding irradiation region are in the point-symmetric arrangement relationship with respect to the single point O in the description above, but may be in other appropriate arrangement relationships.

For example, the reference point for the point symmetry may be different for each light emitting part 41. That is, each light emitting part 41 and its corresponding irradiation region irradiated with the light emitted from the light emitting part are in a point-symmetric arrangement relationship with respect to a predetermined single point provided for each light emitting part 41. Furthermore, the predetermined single point is located on, for example, an axis that connects the center of a light entering portion 71 corresponding to a light emitting part 41 and the center of a light emission portion 72 corresponding to the light entering portion 71. Therefore, a light emitting part 41 and a corresponding irradiation region irradiated with a light emitted from the light emitting part 41 may be in a point-symmetric arrangement relationship with respect to the single point located on the axis that connects the center of the light entering portion 71 corresponding to the light emitting part 41 and the center of the light emission portion 72 corresponding to the light entering portion 71. The axis that connects the center of a light entering portion 71 corresponding to a light emitting part 41 and the center of a light emission portion 72 corresponding to the light entering portion 71 is a central axis C1 of a corresponding unit light converging portion 75. The single point corresponding to each of the plurality of light emitting parts 41 may be the same point.

Also, for example, the reference point for the point symmetry (the single point O in the case of the present embodiment) may not be disposed on the optical axis B2 of the optical lens 30.

Distribution of Light Emitted from Each Light emitting part Next, referring to FIG. 1, a detailed description will be given on the distribution of light until the corresponding irradiation region is irradiated with the light emitted from the light emitting part 41.

A light emitted from the light emitting surface 41a of a light emitting part 41 enters a corresponding unit light converging portion 75 of the light converging member 70, so that the amount of light per unit area is increased by the corresponding unit light converging portion 75. That is, the amount of light (second light amount) φ2 per unit area emitted from the light emission portion 72 of the corresponding unit light converging portion 75 is greater than the amount of light (first light amount) φ1 per unit area incident on the light entering portion 71 of the corresponding unit light converging portion 75. It is preferable that the light whose amount per unit area is increased by the corresponding unit light converging portion 75 is emitted from the light emission portion 72 of the corresponding unit light converging portion 75 at a first full-width half-maximum θ1 and enters a corresponding first unit lens 11. In the corresponding first unit lens 11, a full-width half-maximum of the light entered the corresponding first unit lens 11 is narrowed to a second full-width half-maximum θ2 that is smaller than the first full-width half-maximum θ1. The light emitted from the corresponding first unit lens 11 at the second full-width half-maximum θ2 enters the optical lens 30 through a corresponding incident region 33 corresponding to a respective light emitting part 41. The light entering the optical lens 30 is emitted from a corresponding emission region 34 corresponding to a respective incident region 33 to the outside of the optical lens 30, so that, for example, the irradiation region disposed at the point-symmetric position to the corresponding light emitting part 41 with respect to the single point O is irradiated with the light.

The single point O illustrated as an example is a point on the optical axis B2 of the optical lens 30, as will be described below. Accordingly, the light emitted from the central light emitting part 50 is emitted along the optical axis B2 of the optical lens 30, i.e., in a direction substantially parallel to the optical axis B2, and is irradiated to an irradiation region R33 located directly above the central light emitting part 50. Light emitted from light emitting parts other than the central light emitting part 50 travels intersecting the optical axis B2 of the optical lens 30, and then is irradiated to respective corresponding irradiation regions. The expression "along the optical axis of the optical lens" as used in the present specification refers to, in particular, "through the optical axis of the optical lens."

In the present embodiment, a light emitting part 41 and its corresponding irradiation region are arranged at point-symmetric positions with respect to the single point O located directly above the central light emitting part 50. Thus, in the present embodiment, light emitted from the light emitting parts 41 other than the central light emitting part 50 intersect the optical axis B2 of the optical lens 30 to be irradiated to respective corresponding irradiation regions. However, a light emitting part 41 that emits the light that intersects the optical axis B2 of the optical lens 30 depends on the arrangement relationship between the light emitting parts 41 and the irradiation regions.

That is, in the present embodiment, lights emitted from the plurality of light emitting parts 41 intersect the optical axis B2 of the optical lens 30 or pass through the optical axis B2 of the optical lens 30 to irradiate the irradiation regions.

For the light source 1 according to the present embodiment, the shapes of the incident region 33 in the first surface 31 and the emission region 34 in the second surface 32 of the optical lens 30 are exemplified as one of the factors for irradiating irradiation regions with light emitted from corresponding light emitting parts 41. More specifically, refraction of light in the incident region 33 and refraction of the light in the emission region 34 causes light emitted from a light emitting part 41 to be irradiated to a corresponding irradiation region. This depends on the shape of the incident region 33 in the first surface 31 and the shape of the emission region 34 in the second surface 32.

The refraction of light in the incident region 33 and the refraction of light in the emission region 34 of the optical lens 30 are caused due to a difference between the refractive index of the optical lens 30 and the refractive index of a medium in contact with the optical lens 30. For this reason, a difference between the refractive index of the optical lens 30 and the refractive index of the medium in contact with the optical lens 30 is a parameter that is also to be considered when setting the shape of the first surface 31, including the incident regions 33, and the shape of the second surface 32, including the emission regions 34, of the optical lens 30. In the light source 1 according to the present embodiment, the medium in contact with the optical lens 30 is a space, in which, for example, the air is present. Therefore, in the present embodiment, the difference between the refractive index of the optical lens 30 and the refractive index of the medium in contact with the optical lens 30 is a difference in the refractive index between the optical lens 30 and the air.

Light enters the optical lens 30 through the first unit lens 11. Therefore, the light distribution characteristic of the first unit lens 11 is also a factor for irradiating the corresponding irradiation region with the light emitted from the light emitting part 41. More specifically, an emitting direction (directivity) of the light emitted from the first unit lens 11 is a factor for irradiating the corresponding irradiation region with the light emitted from the light emitting part 41. The emission direction determines the direction of the optical axis of the first unit lens 11.

Such irradiation of the corresponding irradiation region with the light emitted from the light emitting part 41 depends on the shapes of the first surface 31 and the second surface 32 of the optical lens 30. The difference between the refractive index of the optical lens 30 and the refractive index of the medium in contact with the optical lens 30 is also a parameter that can be set for determining the shape of the first surface 31 and the shape of the second surface 32 of the optical lens 30. Further, because a light entering the optical lens 30 is a light emitted from the first unit lens 11, an emitting direction of the light emitted from the first unit lens 11 can also be a parameter for determining the shape of the first surface 31 and the shape of the second surface 32 of the optical lens 30.

Thus, the shape of each of the incident region 33 and the emission region 34 is determined, for example, by simulation, in consideration of the parameters exemplified above.

Hereinafter, components of the light source will be described in detail below with reference to FIGS. 1, 4A and 5.

Substrate

The substrate 2 is a wiring substrate including connection electrodes on the upper surface 2a. Each of the connection electrodes is connected to a respective one of electrodes 44 of the light emitting parts 41, which will be described below.

Frame

As shown in FIGS. 1 and 4A, the frame 3 is disposed on the upper surface 2a of the substrate 2. The frame 3 is a member with a hollow interior and an opening in an upper portion that communicates with the hollow interior. The frame 3 preferably includes, at its inner surface, a light-absorbing member that does not reflect light. The light-absorbing member is formed of, for example, polycarbonate, silicone resin, polyphenylene sulfide (PPS), polyamide (PA), or liquid crystal plastic (LCP). The whole frame 3 may be made of the light-absorbing member. The light emitting parts 41, the light converging member 70, the first lens 10, and the optical lens 30 are disposed in the hollow interior of the frame 3.

The height between the upper surface 2a of the substrate 2 and a top surface of the frame 3 is in a range of, for example, 2.0 mm to 10.0 mm. With such a height between the upper surface 2a of the substrate 2 and the top surface of the frame 3, the light source device can be mounted incorporated in a small electronic device, such as a smartphone.

Light Emitting Part

Figure 5:
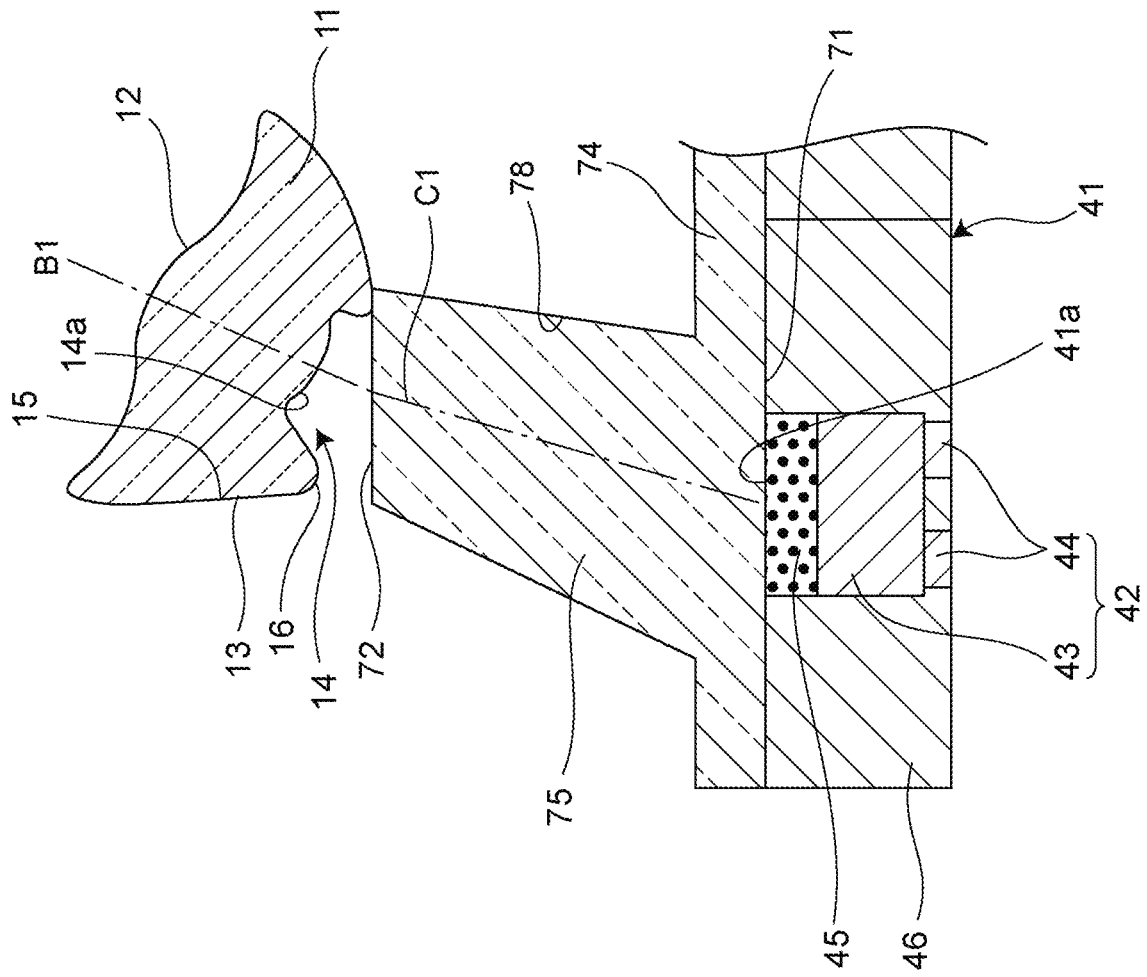
FIG. 5 is a schematic enlarged cross-sectional view of the light emitting part, a light converging member, and a first lens shown in the cross-sectional view of FIG. 4A.

As shown in FIG. 5, each light emitting part 41 includes a light emitting element 42, a wavelength conversion member 45 covering an upper surface of the light emitting element 42, and an light-reflective member 46 (a first light-reflective member 46) covering lateral surfaces of the light emitting element 42 and lateral surfaces of the wavelength conversion member 45. The light emitting element 42 has at least a semiconductor layered body 43 and electrodes 44 having two polarities (for example, a P-side electrode and an N-side electrode). The electrodes 44 are electrically connected to the connection electrodes of the substrate 2. When mounting in a face-down manner, the light emitting element 42 desirably emits light mainly from a surface of the light emitting element 42 opposite to a surface of the light emitting element 42 provided with the electrodes 44 (hereinafter may be referred to as an "upper surface of the light emitting element 42").

The light-reflective member 46 is formed of, for example, a white resin containing a light diffusing material such as titanium oxide. With the light-reflective member 46 covering the lateral surfaces of the light emitting element 42, the light emitted from the lateral surfaces of the light emitting element 42 can be reflected at the light-reflective member 46, to be emitted from the upper surface of the light emitting element 42. This allows for efficiently utilizing the light emitted from the light emitting element 42.

The wavelength conversion member 45 is formed of a silicone resin containing a phosphor or the like, for example. The upper surface of the wavelength conversion member 45 can serve as the light emitting surface 41a of the light emitting part 41. With the wavelength conversion member 45 covering the upper surface of the light emitting element 42, light in a desired wavelength range can be emitted from the light emitting surface 41a of the light emitting part 41.

The light emitting parts 41, each having a configuration described above, can be controlled to be turned on discretely from each other. That is, the plurality of light emitting parts 41 can be individually turned on.

Light Converging Member

The light converging member 70 includes the twenty-five unit light converging portions 75, as shown in FIG. 1. The unit light converging portion 75 according to the present embodiment is a frustum lens having rectangular upper and lower surfaces. The frustum lens is tapered from the lower surface to the upper surface such that an area of the upper surface is smaller than an area of the lower surface. The light entering portion 71 of the unit light converging portion 75 is the lower surface of the frustum lens, and the light emission portion 72 of the unit light converging portion 75 is the upper surface of the frustum lens.

The shape of each of the upper and lower surfaces of the unit light converging portion 75 is not limited to a rectangle, but may be circular, triangle, polygonal, or the like.

The unit light converging portion 75, which is the frustum lens, is disposed with the light entering portion 71 covering the light emitting surface 41a of the corresponding light emitting part 41. The twenty-five unit light converging portions 75 of the present embodiment are connected to each other on the lower surface side to form a monolithic single member. Therefore, the light converging member 70 can be formed as a single lens. However, the twenty-five unit light converging portions 75 may be individual members separated from each other.

In the unit light converging portion 75, the area of the light emission portion 72 is smaller than the area of the light entering portion 71, and the light entered the unit light converging portion 75 is caused to be totally reflected at an inner lateral surface 78 of the unit light converging portion 75, so as to increase the amount of light per unit area. Accordingly, the shape of the unit light converging portion 75 (mainly the ratio of the area of its upper surface to the area of its lower surface), the difference between the refractive index of the unit light converging portion 75 and the refractive index of the medium in contact with the unit light converging portion 75, and the like are appropriately set. In the light source 1 of the present embodiment, the medium in contact with the unit light converging portion 75 is a space, in which, for example, air is present. Therefore, the difference between the refractive index of the unit light converging portion 75 and the refractive index of the medium in contact with the frustum lens is a difference in the refractive index between the frustum lens and the air.

Using the light converging member 70 composed of such unit light converging portions 75 allows for increasing the amount of light per unit area emitted from the light emitting parts 41. Further, using the light converging member 70 allows for using the light emitting part with a larger light emitting surface compared to the case in which the light converging member 70 is not used. The light emitting part with a larger light emitting surface is, i.e., a light emitting part having a large dimension. In the field of light sources, which are progressively becoming reduced in size, the ability to use a light emitting part having a large dimension is an advantage in terms of manufacturing. This can also improve the light extraction efficiency.

As shown in FIG. 4A, the center axes C1 of unit light converging portions 75 corresponding to light emitting parts other than the central light emitting part 50 can be tilted with respect to the optical axis B2 of the optical lens 30 as described below. The central axis C1 of each unit light converging portion 75 is an axis connecting the center of the light entering portion 71 and the center of the light emission portion 72 of each unit light converging portion 75, and is an optical axis of the frustum lens in the present embodiment. Also, in the present specification, the expression that an axis (central axis or optical axis) and another axis (central axis or optical axis) are "tilted" indicates that two axes intersect each other with an angle therebetween; that is, two axes are not parallel to each other. An angle at which the central axis C1 of a unit light converging portion 75 is tilted with respect to the optical axis B2 of the optical lens 30 can be set appropriately according to the arrangement relationship between a light emitting part 41 where the unit light converging portion 75 is disposed and an irradiation region corresponding to the light emitting part.

As described above, in the present embodiment, the twenty-five light emitting parts 41 and the irradiation regions corresponding to respective light emitting parts 41 have a point-symmetric arrangement relationship with respect to the single point O above the central light emitting part 50.

Thus, an angle at which the central axis C1 of each unit light converging portion 75 is tilted with respect to the optical axis B2 of the optical lens 30 (hereinafter also referred to as a tilt angle of the central axis C1 of the unit light converging portion 75) can be set as below.

(1) A central axis C1 of a unit light converging portion 75 disposed in the third row and the second column and a central axis C1 of the unit light converging portion 75 disposed in the third row and the fourth column are tilted at the same tilt angle (hereinafter referred to as a first tilt angle);

(2) a central axis C1 of a unit light converging portion 75 disposed in the second row and the third column and a central axis C1 of a unit light converging portion 75 disposed in the fourth row and the third column are tilted at the same tilt angle (hereinafter referred to as a second tilt angle);

(3) a central axis C1 of a unit light converging portion 75 disposed in the second row and the second column, a central axis C1 of a unit light converging portion 75 disposed in the second row and the fourth column, a central axis C1 of a unit light converging portion 75 disposed in the fourth row and the second column, and a central axis C1 of a unit light converging portion 75 disposed in the fourth row and the fourth column are tilted at the same tilt angle (hereinafter referred to as a third tilt angle);

(4) a central axis C1 of a unit light converging portion 75 disposed in the third row and the first column and a central axis C1 of a unit light converging portion 75 disposed in the third row and the fifth column are tilted at the same tilt angle (hereinafter referred to as a fourth tilt angle);

(5) a central axis C1 of a unit light converging portion 75 disposed in the first row and the third column and a central axis C1 of a unit light converging portion 75 disposed in the fifth row and the third column are tilted at the same tilt angle (hereinafter referred to as a fifth tilt angle);

(6) a central axis C1 of a unit light converging portion 75 disposed in the second row and the first column, a central axis C1 of a unit light converging portion 75 disposed in the second row and the fifth column, a central axis C1 of a unit light converging portion 75 disposed in the fourth row and the first column, and a central axis C1 of a unit light converging portion 75 disposed in the fourth row and the fifth column are tilted at the same tilt angle (hereinafter referred to as a sixth tilt angle);

(7) a central axis C1 of a unit light converging portion 75 disposed in the first row and the second column, a central axis C1 of a unit light converging portion 75 disposed in the first row and the fourth column, a central axis C1 of a unit light converging portion 75 disposed in the fifth row and the second column, and a central axis C1 of a unit light converging portion 75 disposed in the fifth row and the fourth column are tilted at the same tilt angle (hereinafter referred to as a seventh tilt angle);

(8) a central axis C1 of a unit light converging portion 75 disposed in the first row and the first column, a central axis C1 of a unit light converging portion 75 disposed in the first row and the fifth column, a central axis C1 of a unit light converging portion 75 disposed in the fifth row and the first column, and a central axis C1 of a unit light converging portion 75 disposed in the fifth row and the fifth column are tilted at the same tilt angle (hereinafter referred to as an eighth tilt angle); and (9) a central axis C1 of a unit light converging portion (central unit light converging portion 80) corresponding to the central light emitting part 50 coincides the optical axis B2 of the optical lens 30.

Moreover, when the light emitting part 41 has a square shape in a top view, and the sizes of the light emitting surfaces 41a of the light emitting parts 41 are the same, (a) the first tilt angle and the second tilt angle are the same;

(b) the fourth tilt angle and the fifth tilt angle are the same;

(c) the sixth tilt angle and the seventh tilt angle are the same;

(d) the third tilt angle is set larger than each of the first tilt angle and the second tilt angle;

(e) each of the fourth tilt angle and the fifth tilt angle is set larger than each of the first tilt angle and the second tilt angle;

(f) each of the sixth tilt angle and the seventh tilt angle is set larger than each of the fourth tilt angle and the fifth tilt angle; and (g) the eighth tilt angle is set larger than each of the sixth tilt angle and the seventh tilt angle.

Figure 20:
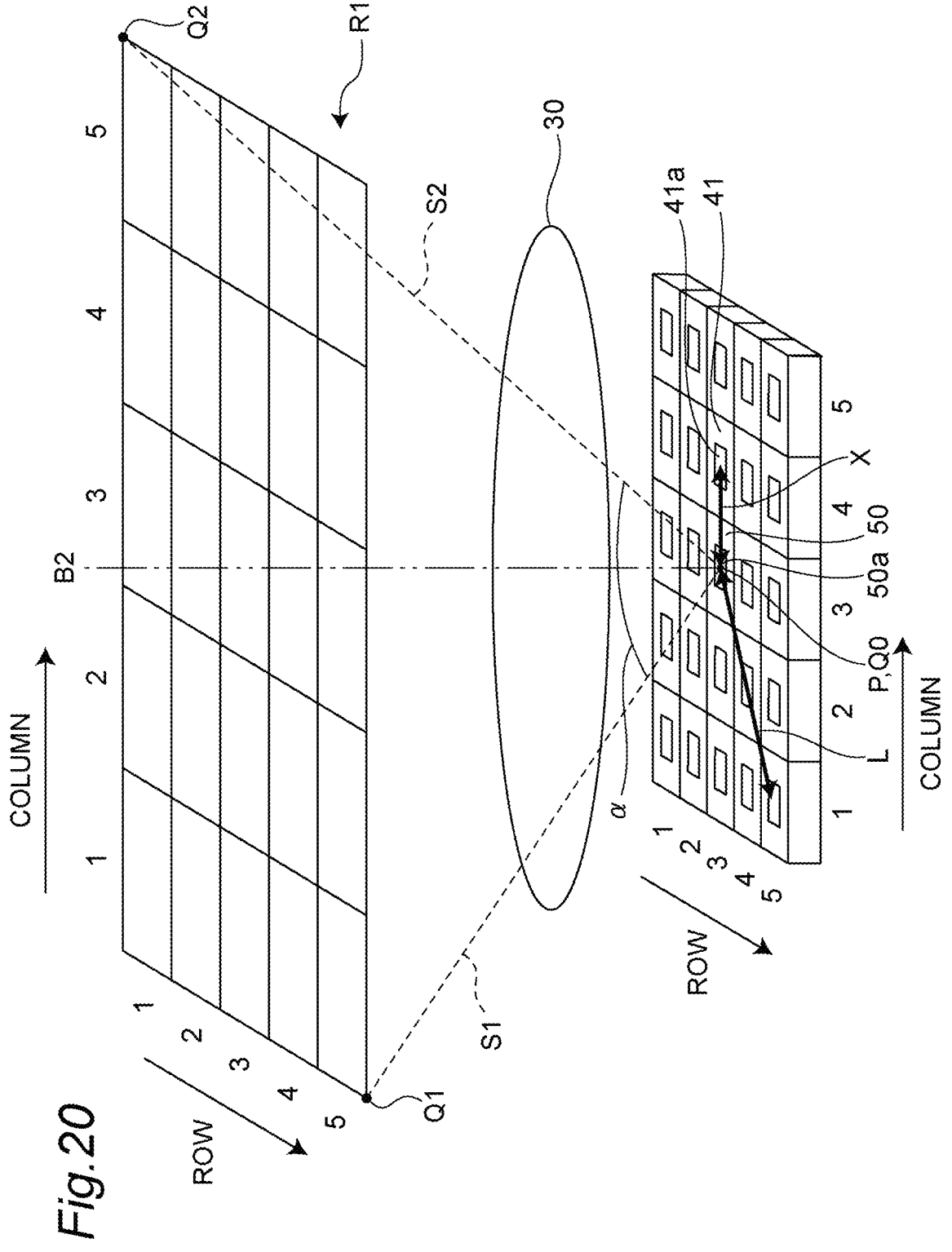
FIG. 20 is a diagram schematically showing the minimum distance L, the minimum distance x, and the angle α in the light source for a flash shown in FIG. 1.

Referring to FIG. 20, a description will be given on a more specific method of calculating an angle γ1 (see FIG. 4C) at which the central axis C1 of at least one of the unit light converging portions 75 is tilted with respect to the optical axis B2 of the optical lens 30 when the light emitting parts 41 are arranged in a matrix. In FIG. 20, illustration of the unit light converging portion 75 and the first unit lens 11 are omitted for ease of understanding of the figures. When the light emitting parts 41 are arranged in a matrix, the angle γ1 can be calculated, for example, by formula (1) given below, under the conditions (i) to (iii):

(i) L is defined as the minimum distance between the optical axis B2 of the optical lens 30 and the center of the light emitting surface 41a of the light emitting part 41 disposed at the corner of the matrix;

(ii) x is defined as the minimum distance between the optical axis B2 of the optical lens 30 and the center of the light emitting surface 41a of the light emitting part 41 corresponding to the light entering portion 71 that has the tilted axis (the central axis C1) ($0 \leq x \leq L$); and (iii) when a central point Q0 is defined as an intersection of a plane on which the light emitting surfaces 41a of the plurality of light emitting parts 41 extend and the optical axis B2 of the optical lens 30 (in the example shown in FIG. 20, the midpoint P of the light emitting surface 50a of the central light emitting part 50), a is defined as an angle formed by a straight line S1 connecting the central point Q0 and one point Q1 of two points, which are diagonally located in the area R1 (which is an area including all the two or more irradiation regions), and a straight line S2 connecting the central point Q0 and the other point Q2 of the two points ($0° < \alpha < 180°$). The expression "light emitting part 41 located at the corner of the matrix" refers to any one of light emitting parts 41 located at four corners of the matrix. Therefore, for example, the light emitting part 41 located at the corner of the matrix of five rows and five columns can be any one of the light emitting part 41 in the first row and the first column, the light emitting part 41 in the first row and the fifth column, the light emitting part 41 in the fifth row and first column, and the light emitting part 41 in the fifth row and the fifth column.

$$\gamma 1 = \tan^{-1}\left(\frac{x}{L} \times \tan\left(\frac{\alpha}{2}\right)\right) \qquad \text{Formula 1}$$

Thus, the central axes C1 of the unit light converging portions 75 can be tilted appropriately with respect to the optical axis B2 of the optical lens 30 according to the arrangement relationship between each light emitting part 41 corresponding to a respective unit light converging portion 75 and a irradiation region corresponding to this light emitting part, so that the corresponding irradiation regions can be irradiated more efficiently with the light emitted from the light emitting parts 41.

When a central axis C1 of a unit light converging portion 75 is tilted with respect to the optical axis B2 of the optical lens 30, the tilt angle of the central axis C1 is a factor to be considered in determining the tilt angle of the optical axis B1 of a corresponding first unit lens 11. Therefore, the tilt angle of the central axis C1 of the unit light converging portion 75 with respect to the optical axis B2 of the optical lens 30 can also be a parameter that is to be considered so as to set the shapes of the incident region 33 and the emission region 34 of the optical lens 30 as described above.

Figure 4B:
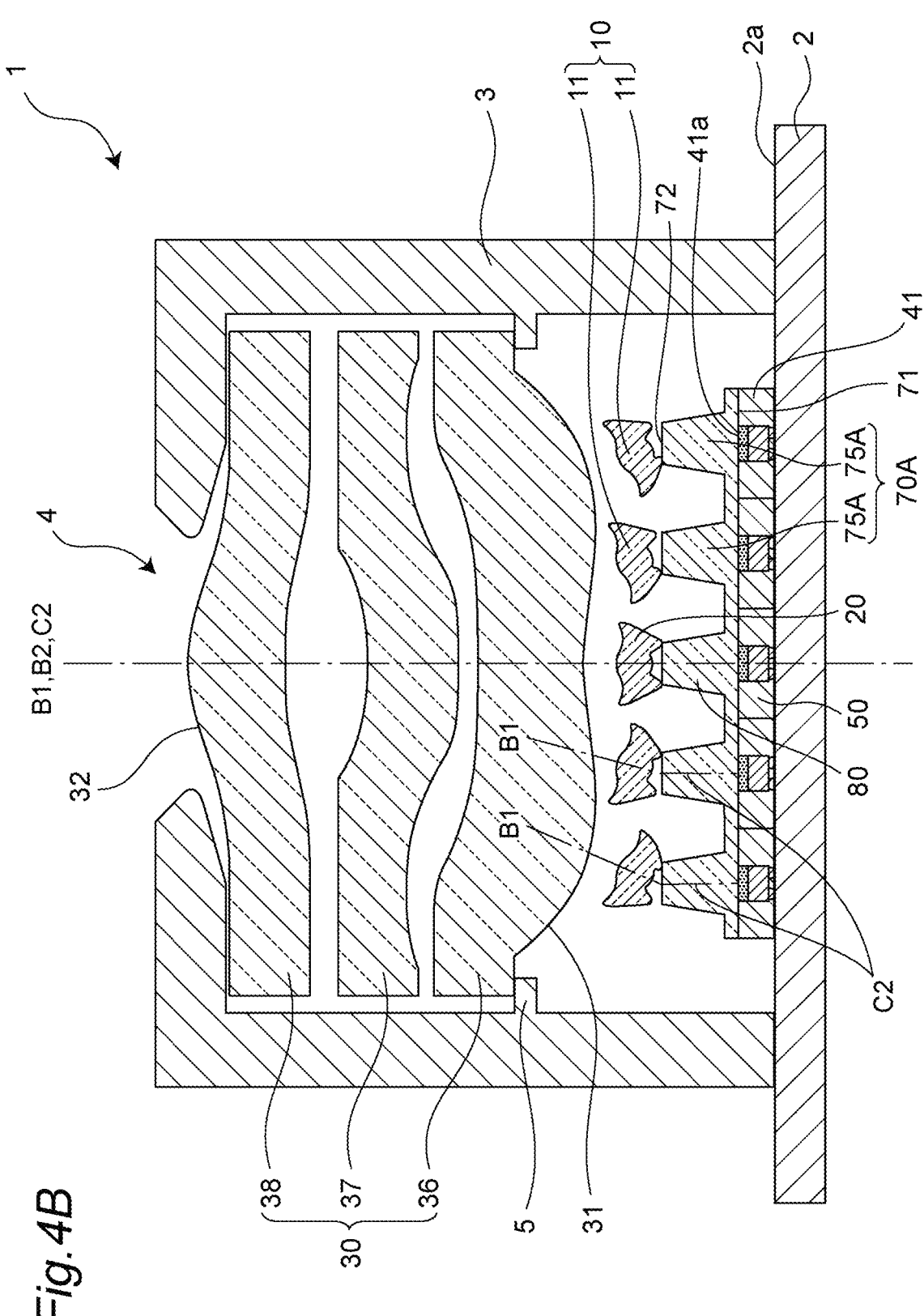
FIG. 4B is another schematic cross-sectional view taken along the line A-A of the light source for a flash shown in FIG. 1 when the central axes of all unit light converging portions are parallel to the optical axis of an optical lens.

While the central axes C1 of the unit light converging portions 75 other than the central unit light converging portion 80 are tilted with respect to the optical axis B2 of the optical lens 30 in the description above, the central axis C1 of the unit light converging portions 75 other than the central unit light converging portion 75 may be parallel to the optical axis B2 of the optical lens 30. In this case, as shown in FIG. 4B, the central axis C2 of each of all the unit light converging portions 75 including the central unit light converging portion 80 is preferably parallel to the optical axis B2 of the optical lens 30. This allows for increasing the light intensity at the upper surface of, especially directly above the light emitting element 42, in the light emitting part 41, so that light can be efficiently extracted through the unit light converging portions 75 that has the central axis C1 parallel to the optical axis B2 of the optical lens 30. Also, such a simple shape of the light converging member 70A allows for facilitating producing a mold used for forming the unit light converging portion 75A.

First Lens

Figure 11:
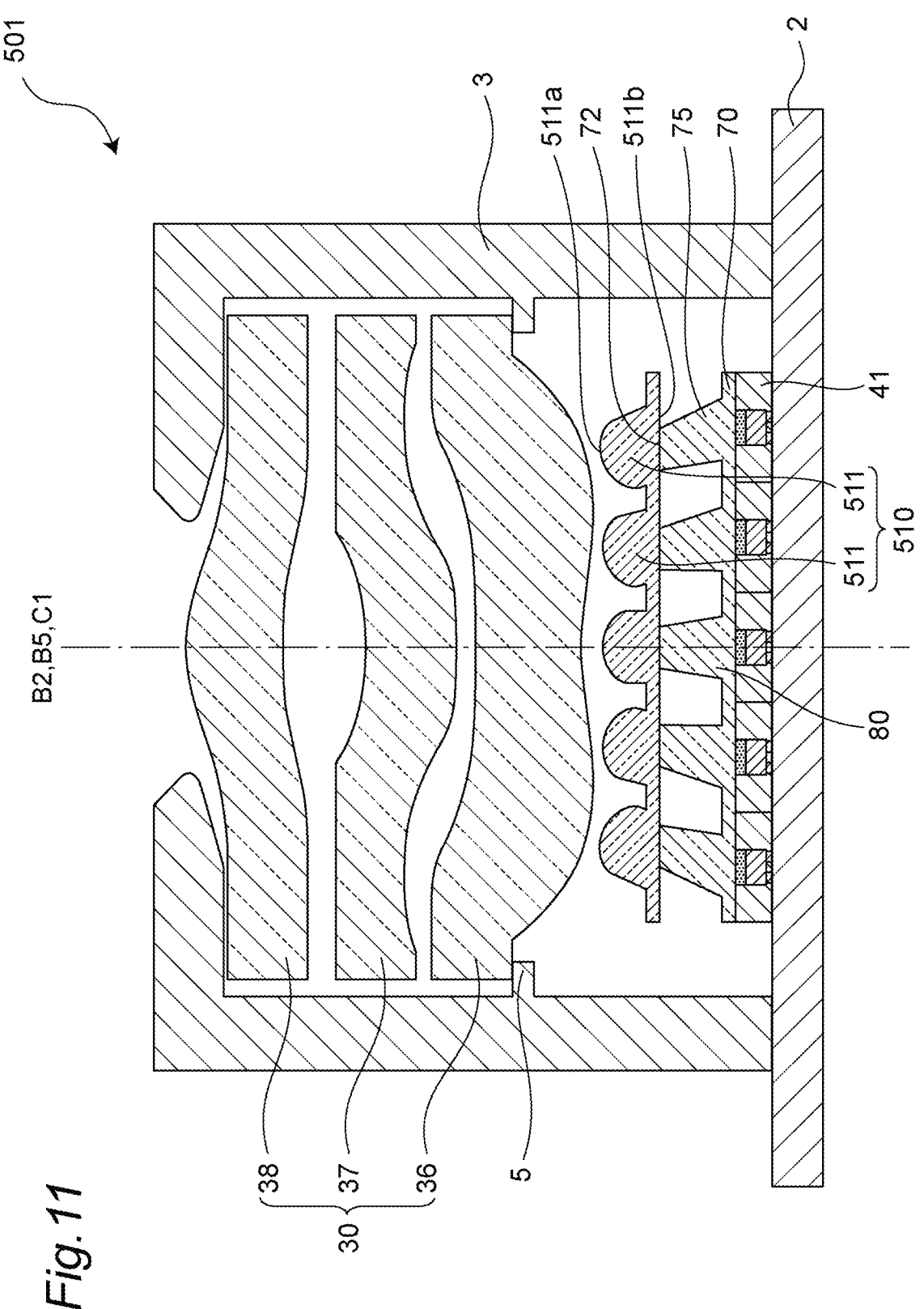
FIG. 11 is a schematic cross-sectional view of a light source for a flash according to a second variant example of the present disclosure.

The first lens 10 is provided to narrow the full-width half-maximum of a light emitted from the light emission portion 72 of each unit light converging portion 75 and cause the light to have the directivity toward a corresponding irradiation region. The first lens 10 according to the present embodiment is provided for each unit light converging portion 75, and includes twenty-five first unit lenses 11, each corresponding to the light emission portion 72 of a respective one of the unit light converging portions 75. As shown in FIG. 1, the first unit lenses 11 are provided to be separated from each other. However, the first unit lens 11 may be a single member connected and monolithic with adjacent first unit lenses as shown in FIG. 11 to be described. Such a first lens 10 in which the first unit lenses are monolithic can be regarded as a single lens that collectively covers the light emission portions 72 of the twenty-five unit light converging portions 75 and includes the twenty-five first unit lenses 11, each provided for a respective unit light converging portion 75.

The first unit lens 11 in the present embodiment is a total internal reflection lens (TIR lens). As used herein, the term "total internal reflection lens" refers to a lens configured to adjust the directivity of light by utilizing total reflection inside the lens. As shown in FIG. 5, the total internal reflection lens used in the present embodiment has a lower surface 13 in which a recess 14 is defined and an upper surface 12 having a corrugated cross-sectional shape. The total internal reflection lens is a lens of a substantially conical trapezoidal shape that is tapered from the upper surface 12 to the lower surface 13. The total internal reflection lens used in the present embodiment has a rotationally symmetric shape with respect to the optical axis B1.

The first unit lens 11, which is the total internal reflection lens, is disposed such that the inner surface 14a defining the recess 14 is located above the light emitting surface 41a of the light emitting part 41 and covers the light emitting surface 41a. That is, the first unit lens 11 is disposed such that an opening end 16 of the recess 14 (i.e., a connection portion between the inner surface 14a of the recess 14 and the lower surface 13) is located outward of the outer periphery of the light emitting surface 41a in a top view.

Next, referring to FIGS. 1, 2A and 4A, the extending direction of the optical axis B1 of the first unit lens 11 will be described.

As shown in FIG. 2A, the first unit lenses 11 corresponding to respective unit light converging portions 75 arranged in a matrix of five rows and five columns are also arranged in a matrix of five rows and five columns. The optical axis B1 of the first unit lens 11 may be parallel to the optical axis B2 of the optical lens 30, but the optical axis B1 of at least one first unit lens 11 is preferably tilted with respect to the optical axis B2 of the optical lens 30. In the present embodiment, as shown in FIGS. 1 and 4A, the optical axis B1 of each of the other first unit lenses 11 other than the first unit lens (central first unit lens) 20 disposed corresponding to the central unit light converging portion 80 is disposed to be tilted with respect to the optical axis B2 of the optical lens 30 to be described later. The tilt angles of the optical axis B1 of the first unit lenses 11 other than a central first unit lens 20 with respect to the optical axis B2 of the optical lens 30 can be set to values that are different for each first unit lens 11 mainly according to the tilt angle of the central axis C1 of the corresponding unit light converging portion 75 and the arrangement relationship between the light emitting part 41 corresponding to the first unit lens 11 and the irradiation region corresponding to the light emitting part 41.

As described above, in the present embodiment, the twenty-five light emitting parts 41 and the irradiation regions corresponding to respective light emitting parts 41 have the point-symmetric arrangement relationship with respect to the single point O above the central light emitting part 50.

Therefore, (1) an optical axis B1 of a first unit lens 11 disposed in the third row and the second column and an optical axis B1 of a first unit lens 11 disposed in the third row and the fourth column are tilted at the same tilt angle (hereinafter referred to as a first angle) with respect to the optical axis B2 of the optical lens 30;

(2) an optical axis B1 of a first unit lens 11 disposed in the second row and the third column and an optical axis B1 of a first unit lens 11 disposed in the fourth row and the third column are tilted at the same tilt angle (hereinafter referred to as a second angle) with respect to the optical axis B2 of the optical lens 30;

(3) an optical axis B1 of a first unit lens 11 disposed in the second row and the second column, an optical axis B1 of a first unit lens 11 disposed in the second row and the fourth column, an optical axis B1 of a first unit lens 11 disposed in the fourth row and the second column, and an optical axis B1 of a first unit lens 11 disposed in the fourth row and the fourth column are tilted at the same tilt angle (hereinafter referred to as a third angle) with respect to the optical axis B2;

(4) an optical axis B1 of a first unit lens 11 disposed in the third row and the first column and an optical axis B1 of a first unit lens 11 disposed in the third row and the fifth column are tilted at the same tilt angle (hereinafter referred to as a fourth angle) with respect to the optical axis B2 of the optical lens 30;

(5) an optical axis B1 of a first unit lens 11 disposed in the first row and the third column and an optical axis B1 of a first unit lens 11 disposed in the fifth row and the third column are tilted at the same tilt angle (hereinafter referred to as a fifth angle) with respect to the optical axis B2 of the optical lens 30;

(6) an optical axis B1 of a first unit lens 11 disposed in the second row and the first column, an optical axis B1 of a first unit lens 11 disposed in the second row and the fifth column, an optical axis B1 of a first unit lens 11 disposed in the fourth row and the first column, and an optical axis B1 of a first unit lens 11 disposed in the fourth row and the fifth column are tilted at the same tilt angle (hereinafter referred to as a sixth angle) with respect to the optical axis B2 of the optical lens 30;

(7) an optical axis B1 of a first unit lens 11 disposed in the first row and the second column, an optical axis B1 of a first unit lens 11 disposed in the first row and the fourth column, an optical axis B1 of a first unit lens 11 disposed in the fifth row and the second column, and an optical axis B1 of a first unit lens 11 disposed in the fifth row and the fourth column are tilted at the same tilt angle (hereinafter referred to as a seventh angle) with respect to the optical axis B2 of the optical lens 30; and (8) an optical axis B1 of a first unit lens 11 in the first row and the first column, an optical axis B1 of a first unit lens 11 in the first row and the fifth column, an optical axis B1 of a first unit lens 11 in the fifth row and the first column, and an optical axis B1 of a first unit lens 11 in the fifth row and the fifth column are tilted at the same tilt angle (hereinafter referred to as an eighth angle) with respect to the optical axis B2 of the optical lens 30.

Moreover, when the light emitting part 41 has a square shape in a top view and the sizes of the light emitting surfaces 41a of the light emitting parts 41 are all the same, (a) the first angle and the second angle are the same;

(b) the fourth angle and the fifth angle are the same;

(c) the sixth angle and the seventh angle are the same;

(d) the third angle is set larger than each of the first angle and the second angle;

(e) each of the fourth angle and the fifth angel is set larger than each of the first angle and the second angle;

(f) each of the sixth angle and the seventh angle is set larger than each of the fourth angle and the fifth angle; and (g) the eight angle is set larger than each of the sixth angle and the seventh angle.

The angle at which the optical axis B1 of the first unit lens 11 is tilted with respect to the optical axis B2 of the optical lens 30 is set according to the tilt angle of the central axis C1 of the corresponding unit light converging portion 75.

For example, an angle $\gamma2$ at which the optical axis B1 of the first unit lens 11 is tilted with respect to the optical axis B2 of the optical lens 30 (see FIG. 4C) may be the same as the angle $\gamma1$ at which the central axis C1 of the unit light converging portion 75 is tilted with respect to the optical axis B2 of the optical lens 30. When the angle $\gamma1$ and the angle $\gamma2$ are the same and the $\gamma1$ is expressed by the above-described formula 1, the $\gamma2$ can be expressed by the following formula 2 using the minimum distance L, the minimum distance x, and the angle $\alpha$ used in the above-described formula 1.

$$\gamma2 = \gamma1 = \tan^{-1}\left(\frac{x}{L} \times \tan\left(\frac{\alpha}{2}\right)\right) \qquad \text{Formula 2}$$

Optical Lens

As shown in FIG. 4A, the optical lens 30 is disposed above the light emitting parts 41, and collectively covers the twenty-five light emitting parts 41, the light converging member 70, and the first lens 10. The optical lens 30 according to the present embodiment is composed of a plurality of lenses, specifically, a first optical lens 36, a second optical lens 37, and a third optical lens 38, which are disposed in that order from a first lens 10 side. The first optical lens 36, the second optical lens 37, and the third optical lens 38 are arranged with spaces between respective adjacent lenses. Within the spaces, for example, air is present. The first optical lens 36, the second optical lens 37, and the third optical lens 38 are disposed to be supported and secured on the supporting portion 5 at their respective end portions, the supporting portion 5 being located on the inner lateral surface of the frame 3. In the accompanying drawings, illustration of a supporting portion that supports the second optical lens 37 and a supporting portion that supports the third optical lens 38 are omitted. The first optical lens 36, the second optical lens 37, and the third optical lens 38 are disposed with their optical axes coinciding with each other. Thus, the optical axis B2 of the optical lens 30 is specified as a single axis. In the present embodiment, the optical lens 30 is disposed such that its optical axis B2 is orthogonal to the upper surface 2a of the substrate 2 and passes through the midpoint P of the central light emitting part 50. Therefore, the single point O that determines the point-symmetric arrangement relationship between the light emitting part 41 and the corresponding irradiation region is located on the optical axis B2 of the optical lens 30.

The first optical lens 36, the second optical lens 37, and the third optical lens 38 may be supported using appropriate configurations other than the supporting portion 5 being located on the inner lateral surface of the frame 3. For example, the first optical lens 36, the second optical lens 37, and the third optical lens 38 may be attached to a supporting rod provided on an inner upper surface of the frame 3 to be supported.

The optical lens 30 has a first surface 31 located on the light emitting surface 41a side of the light emitting part 41 and a second surface 32 on the opposite side to the first surface 31, i.e., located at the opening 4 side of the frame 3. As in the present embodiment, when the optical lens 30 includes the first optical lens 36, the second optical lens 37, and the third optical lens 38, a surface of the first optical lens 36 at a light emitting part 41 side is the first surface 31, and a surface of the third optical lens 38 at an opening 4 side of the frame 3 is the second surface 32.

The first surface 31 includes a plurality of incident regions 33 corresponding to respective light emitting parts 41 such that light emitted from each of the light emitting parts 41 is incident on a respective one of the light emitting parts 41. The second surface 32 includes a plurality of emission regions 34 corresponding to the respective plurality of incident regions 33.

As described above, distribution characteristic of light emitted from each light emitting part 41 depends on the shapes of the first surface 31 including the incident regions 33 and the second surface 32 including the emission regions 34 of the optical lens 30. In the present embodiment, the optical lens 30 is composed of three lenses, namely, the first optical lens 36, the second optical lens 37, and the third optical lens 38, which are spaced apart from each other with the air interposed therebetween. Therefore, the distribution characteristic of light between the incident region 33 and the emission region 34 can be influenced by a shape of a region of the first optical lens 36 (the emission region) from which light is emitted, the difference between the refractive index of the first optical lens 36 and the refractive index of the air, a shape of a region of the second optical lens 37 (the incident region) on which light is incident, a shape of a region of the second optical lens 37 (the emission region) from which light is emitted, the difference between the refractive index of the second optical lens 37 and the refractive index of the air, a shape of a region of the third optical lens 38 (the incident region) on which light is incident, and the difference between the refractive index of the third optical lens 38 and the refractive index of the air. Thus, a shape of the incident region 33 and a shape of the emission region 34 are designed in consideration of these factors.

Figure 4C:
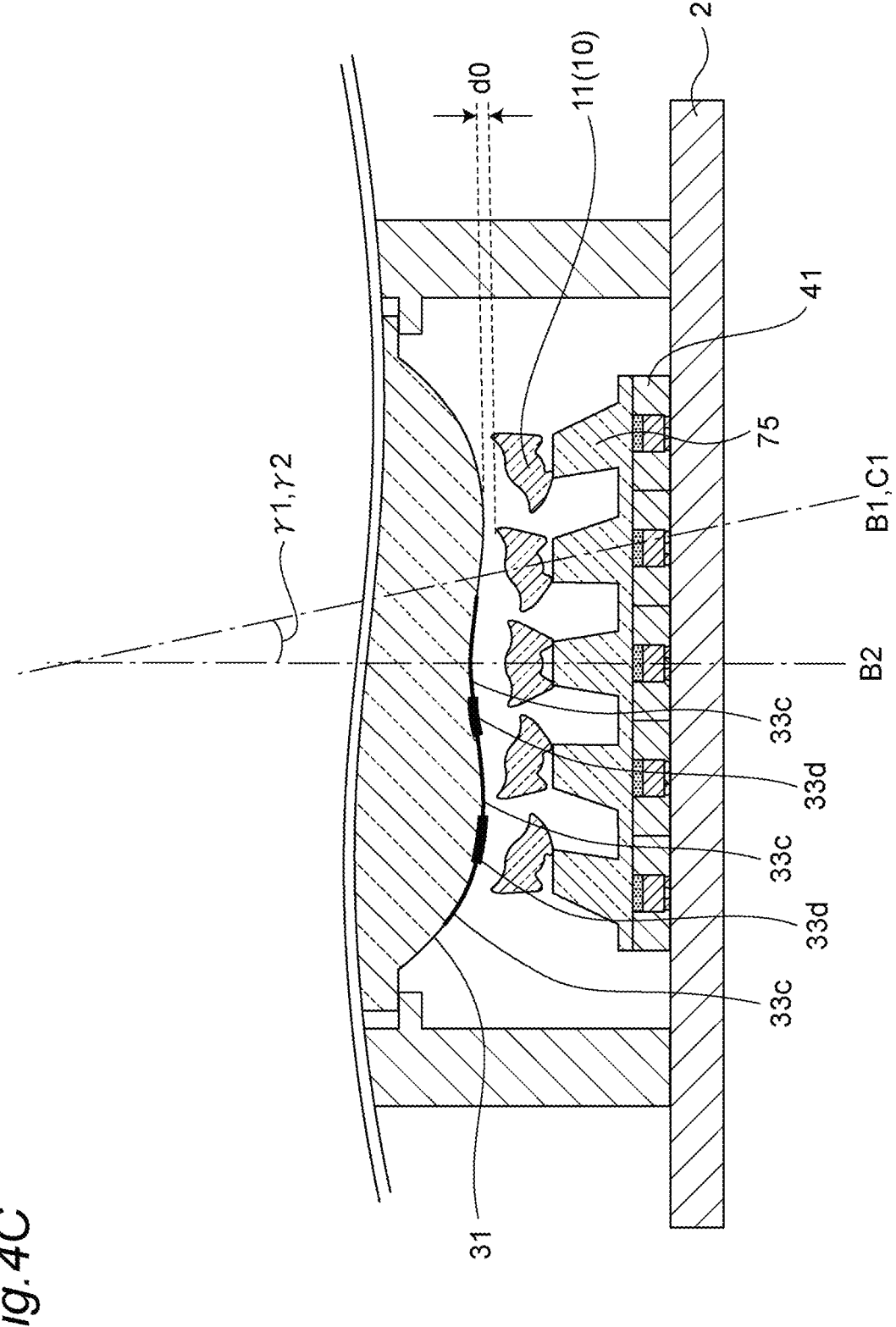
FIG. 4C is a schematic partially enlarged view of the cross-sectional view shown in FIG. 4A.

Incident regions 33 through which lights emitted from corresponding adjacent light emitting parts 41 enter the optical lens 30 may entirely or partially overlap each other, depending on the full-width half-maximum θ2 of the light emitted from corresponding first unit lenses 11, the distance from the first unit lenses 11 to the optical lens 30, the tilt angle of the optical axis B1 of the corresponding first unit lens 11 with respect to the optical axis B2 of the optical lens 30, and the like. Therefore, two adjacent incident regions 33 of the plurality of incident regions 33 of the optical lens 30 may entirely or partially overlap. In the present specification, in the incident regions 33, regions on each of which only light emitted from a corresponding first unit lens 11 is incident will be referred to as "first incident regions 33c," and regions each overlapping adjacent incident regions 33 will be referred to as "second incident regions 33d." The first incident regions 33c and the second incident regions 33d are shown in FIG. 4C. Therefore, each incident region 33 of the optical lens 30 may include the first incident region 33c on which the light emitted from a light emitting part 41 corresponding to the incident region 33 is incident, and the second incident region 33d on which light emitted from an adjacent light emitting part 41 light from the one light emitting part 41 are incident. Thus, each incident region 33 may not necessarily be designed discretely, but may be designed appropriately in relation to adjacent incident regions.

Similarly, emission regions 34 of the optical lens 30 through which lights entered the optical lens 30 from corresponding adjacent incident regions 33 are emitted may entirely or partially overlap each other, depending on the position of the corresponding incident region 33, the difference between the refractive index of the optical lens 30 and the refractive index of the medium in contact with the optical lens 30, the arrangement of the corresponding incident regions, and the like. Therefore, two adjacent emission regions 34 of the plurality of emission regions 34 of the optical lens 30 may entirely or partially overlap. In the present specification, in the emission regions 34, regions from each of which only light that has been emitted from a corresponding first unit lens 11 is emitted will be referred to as "first emission regions 34c," and regions each overlapping adjacent emission regions 34 will be referred to as second emission regions 34d. The first emission regions 34c and the second emission regions 34d are shown in FIG. 4A. Therefore, each emission region 34 of the optical lens 30 may include the first emission region 34c from which light entering the optical lens 30 through a corresponding incident region 33 is emitted, and the second emission region 34d from which light entered the optical lens 30 from an adjacent incident region 33 and light entering through the corresponding incident region 33 are emitted. Thus, each emission region 34 may not necessarily be designed discretely, but may be appropriately designed in relation to the adjacent emission region 34.

A minimum distance d0 between the first surface 31 of the optical lens 30 and the first lens 10, shown in FIG. 4C, is, for example, 0.1 mm or more and 1.0 mm or less, and preferably 0.1 mm or more and 0.5 mm or less. The minimum distance d0 in the present embodiment refers to an interval between the first surface 31 of the optical lens 30 and the first lens 10 which are located closest to each other, regardless of the shape of the first surface 31 of the optical lens 30 and the shape of the first lens 10. With such a minimum distance d0 between the first surface 31 of the optical lens 30 and the first lens 10, the light source device can be mounted on a small electronic device, such as a smartphone.

Next, referring to FIGS. 6A to 7B, a detailed description will be given on the distribution of light emitted from each light emitting part 41.

Distribution of Light Emitted from Central Light Emitting Part

Figure 6A:
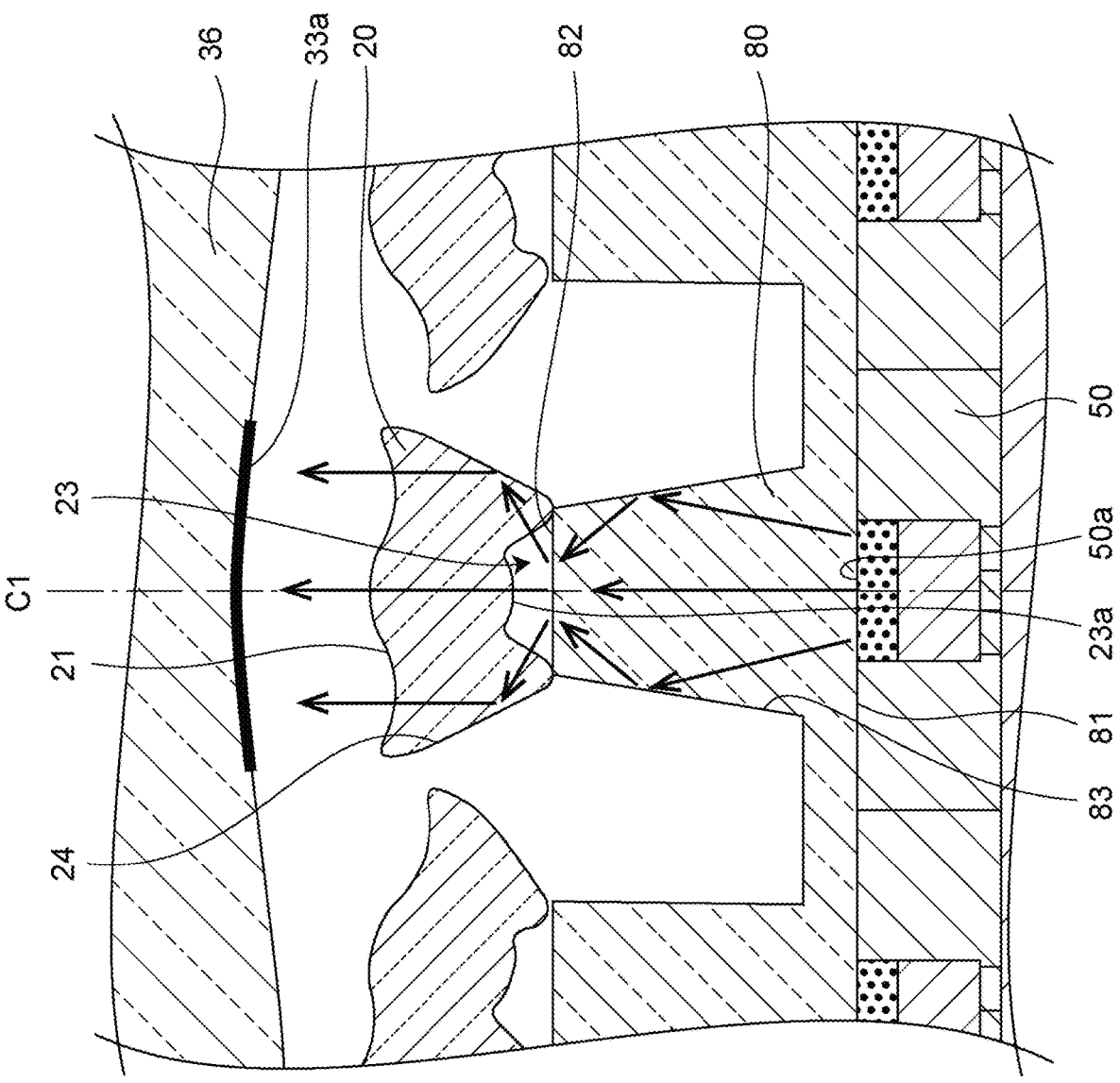
FIG. 6A is a schematic enlarged view of a portion shown in FIG. 4A, showing a state in which the light from a central light emitting part enters the optical lens through a central unit light converging portion and a central first unit lens.
Figure 6B:
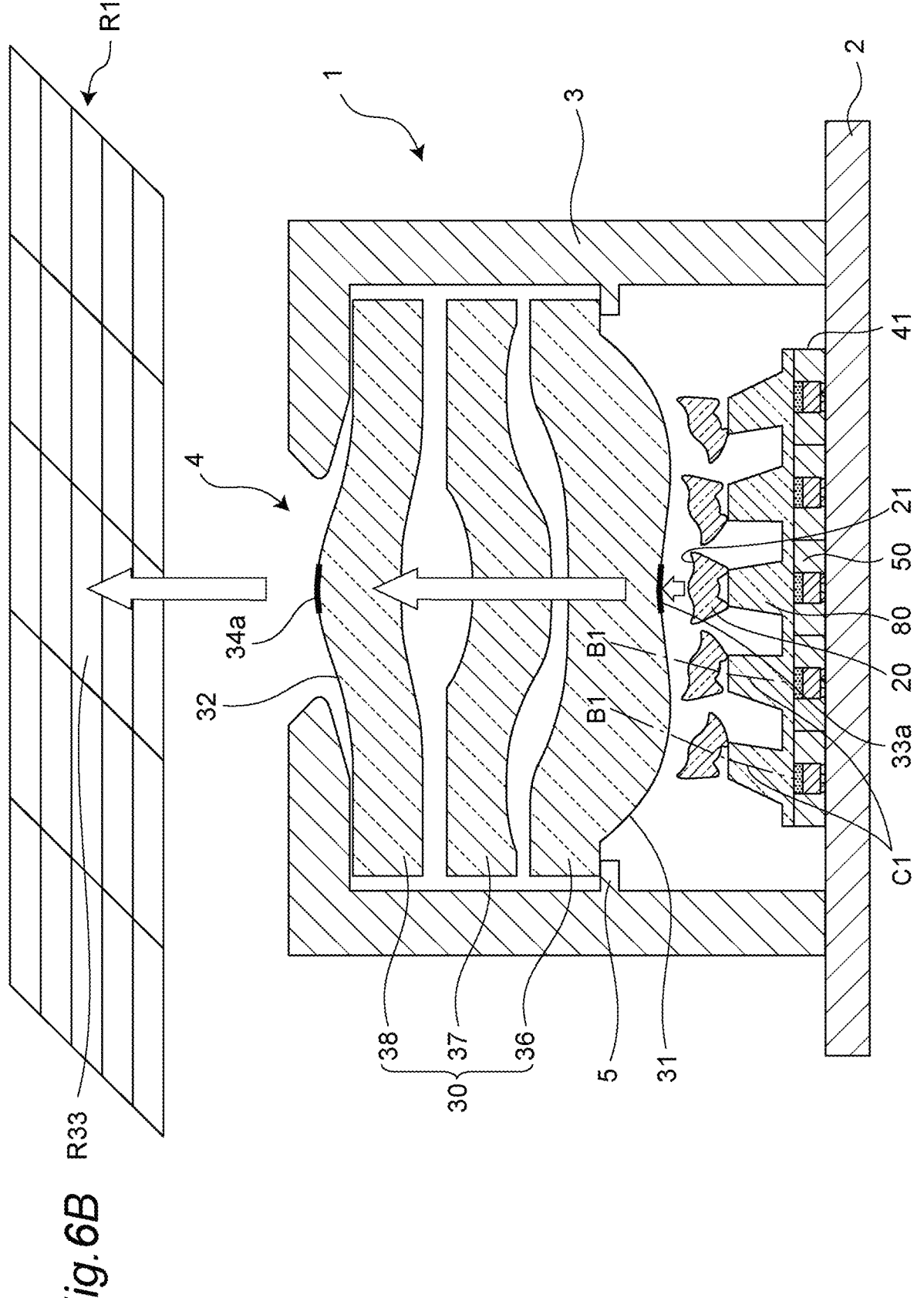
FIG. 6B schematically shows a state in which a light emitted from the central first unit lens is irradiated to a corresponding irradiation region through the optical lens in the cross-sectional view shown in FIG. 4A.

As shown in FIGS. 6A and 6B, the light emitted from the light emitting surface 50*a* of the central light emitting part 50 mainly travels in sequence as described below.

(1) A first light amount (the amount of light per unit area) φ1 of light enters the central unit light converging portion 80 through the light entering portion 81 of the central unit light converging portion 80 (see FIG. 6A).

(2) Subsequently, the light is totally reflected at an inner lateral surface 83 of the central unit light converging portion 80, increasing the amount of light per unit area to a second light amount (the amount of light per unit area) φ2.

(3) Then, the second light amount φ2 of the reflected light is emitted from the light emission portion 82 of the central unit light converging portion 80 to the outside of the central unit light converging portion 80 at the first full-width half-maximum θ1.

(4) The emitted light enters the central first unit lens 20 through an inner surface 23*a* of a recess 23 of the central first unit lens 20.

(5) Subsequently, the light is totally reflected by an inner lateral surface 24 of the central first unit lens 20, so that its full-width half-maximum is narrowed.

(6) Then, the light is emitted from an upper surface 21 of the central first unit lens 20 at the second full-width half-maximum θ2.

(7) The emitted light enters the optical lens 30 through the incident region 33*a* corresponding to the central light emitting part 50 (see FIG. 6B).

(8) Then, the light is emitted from the emission region 34*a* corresponding to the incident region 33*a* to the outside of the optical lens 30.

(9) The irradiation region (irradiation region located directly above the central light emitting part 50) R33 corresponding to the central light emitting part 50 is irradiated with the emitted light.

In order to irradiate the irradiation region R33 disposed directly above the central light emitting part 50 with the light, the central axis C1 of the central unit light converging portion 80 is disposed so as to be orthogonal to the light emitting surface 50*a* of the central light emitting part 50, and the central first unit lens 20 is disposed such that the optical axis B1 is orthogonal to the light emission portion 82 of the central unit light converging portion 80. That is, the central axis C1 of the central unit light converging portion 80 and the optical axis B1 of the central first unit lens 20 are disposed on the optical axis B2 of the optical lens 30.

The shape of an incident region 33*a* (an incident region of the first optical lens 36) of the optical lens 30 that corresponds to the central light emitting part 50 and the shape of an emission region 34*a* (the emission region of the third optical lens 38) of the optical lens 30 that corresponds to the incident region 33*a* are appropriately designed so that the irradiation region R33 disposed directly above the central light emitting part 50 is irradiated with the light emitted from the central first unit lens 20.

Likewise, the shape of the emission region of the first optical lens 36 which corresponds to the central light emitting part 50, the shapes of the incident region and the emission region of the second optical lens 37, and the shape of the incident region of the third optical lens 38 are appropriately designed so that the irradiation region R33 disposed directly above the central light emitting part 50 is irradiated with the light emitted from the central first unit lens 20.

Distribution of Light Emitted from Light Emitting Part Other than Central Light Emitting Part 50

The distribution of light from the light emitting part other than the central light emitting part 50 varies depending on the position of the light emitting part, but the light emitting parts other than the central light emitting part 50 are the same in that the light from each of these light emitting parts intersects the optical axis B2 of the optical lens 30, causing the corresponding irradiation region to be irradiated with the light.

For this reason, the distribution of light emitted from the light emitting parts other than the central light emitting part 50 will be described below by taking as an example, the light emitting part (peripheral light emitting part) 55 (see FIG. 2A) disposed in the first row and third column.

Figure 7A:
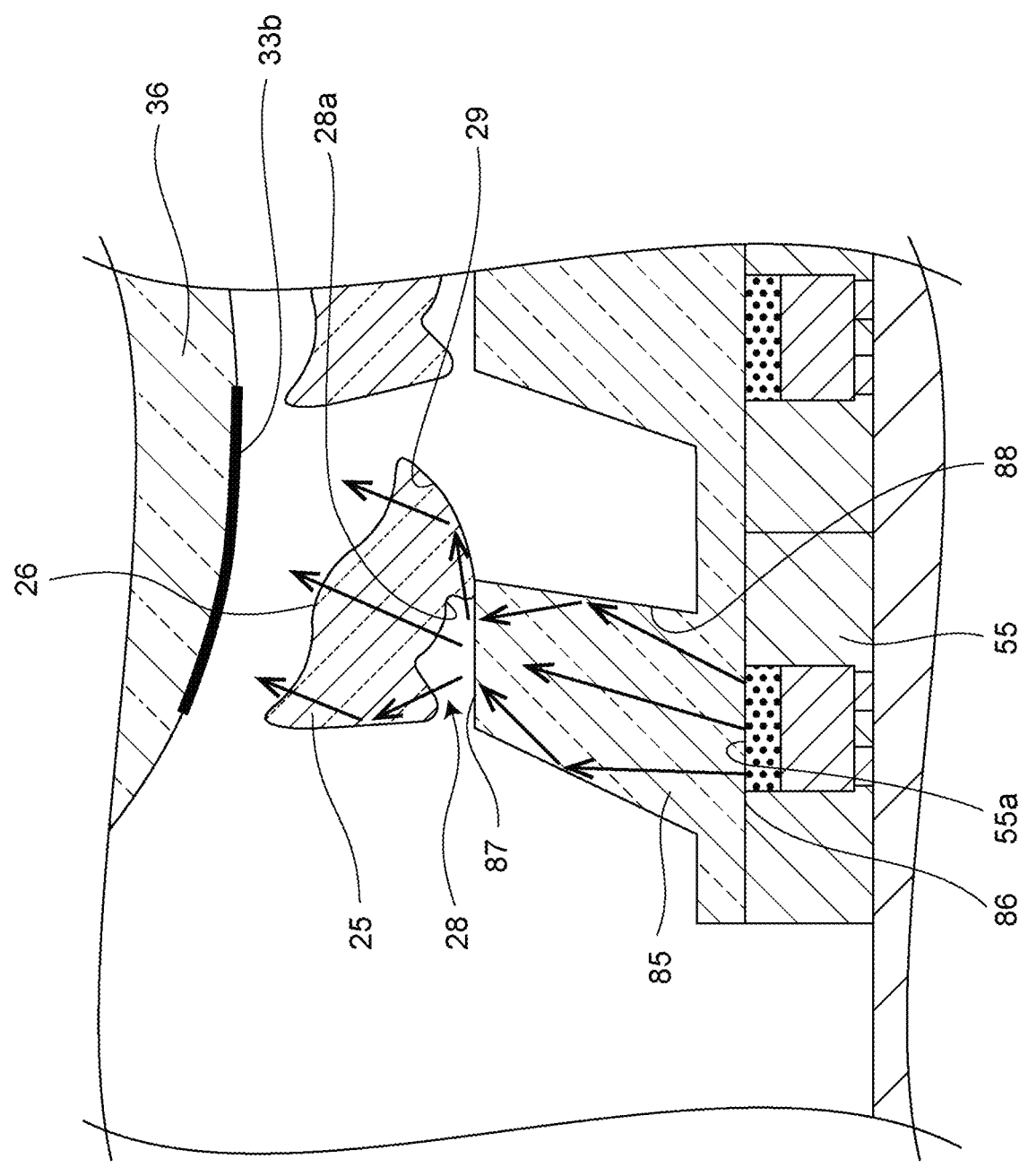
FIG. 7A is a schematic enlarged view of a portion shown in FIG. 4A, showing a state in which the light from a peripheral light emitting part enters the optical lens through a peripheral unit light converging portion and a peripheral first unit lens.

As shown in FIG. 7A, the light emitted from a light emitting surface 55*a* of the peripheral light emitting part 55 mainly travels as follows.

(1) A first light amount (the amount of light per unit area) φ1 (see FIG. 7A) of light enters a peripheral unit light converging portion 85 from the light entering portion 86 of the peripheral unit light converging portion 85.

(2) Subsequently, the entered light is totally reflected at an inner lateral surface 88 of the peripheral unit light converging portion 85, increasing the amount of light per unit area to the second light amount (the amount of light per unit area) φ2.

(3) Then, the second light amount φ2 of the reflected light is emitted from the light emission portion 87 of the peripheral unit light converging portion 85 to the outside of the peripheral unit light converging portion 85 at the first full-width half-maximum θ1.

(4) The emitted light enters the peripheral first unit lens 25 from an inner surface 28*a* of a recess 28 of the first unit lens (peripheral first unit lens) 25 which is disposed to cover a light emission portion 87 of the peripheral unit light converging portion 85.

(5) Subsequently, the light is totally reflected at an inner lateral surface 29 of the peripheral first unit lens 25, so that its full-width half-maximum is narrowed.

(6) Then, the light is emitted from an upper surface 26 of the peripheral first unit lens 25 at the second full-width half-maximum θ2.

Figure 7B:
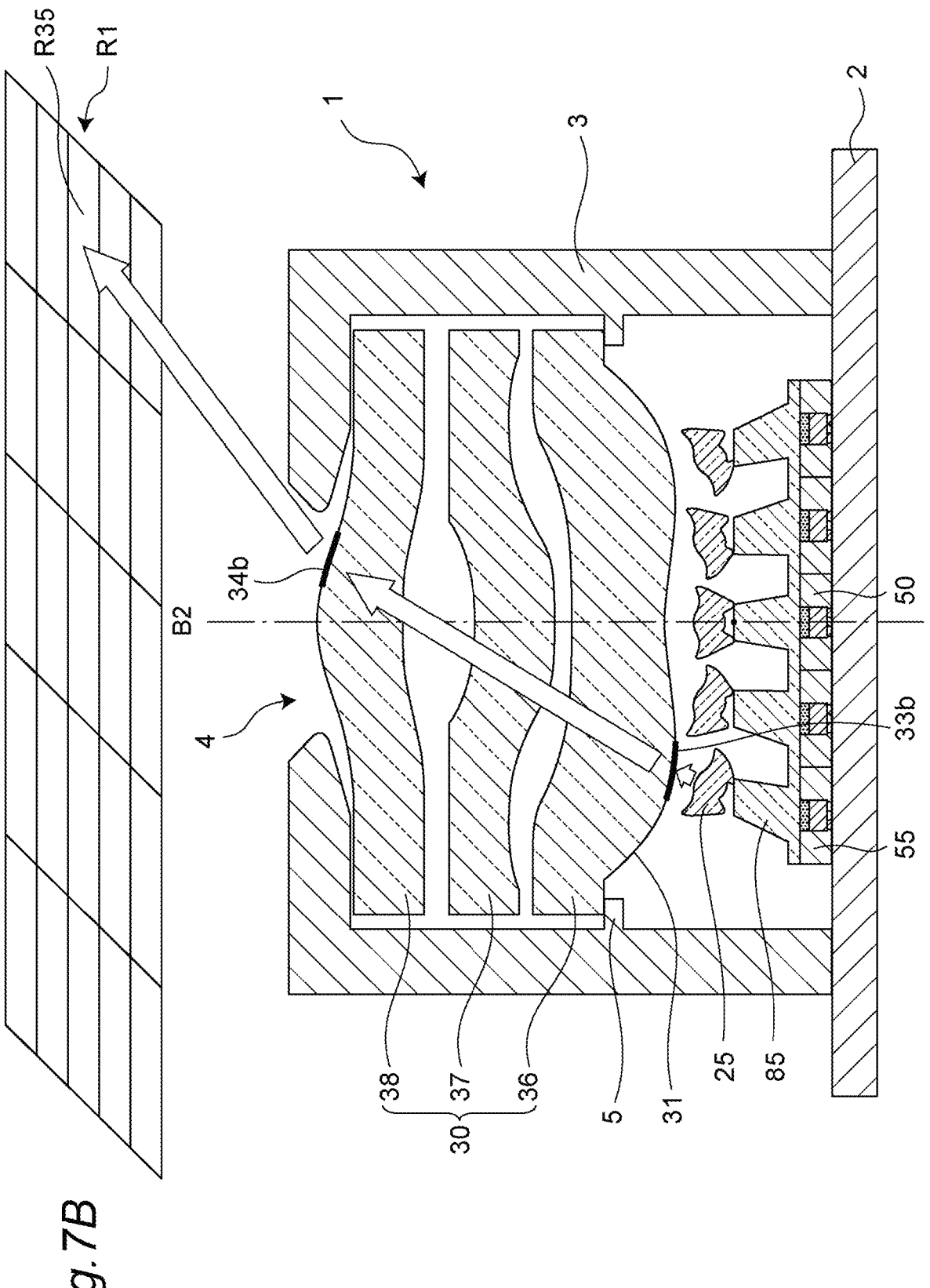
FIG. 7B schematically shows a state in which the light emitted from the peripheral first unit lens irradiates the corresponding irradiation region through the optical lens in the cross-sectional view shown in FIG. 4A.

(7) The emitted light enters the optical lens 30 from the incident region 33*b* corresponding to the peripheral light emitting part 55 (see FIG. 7B).

(8) Then, the light intersects the optical axis B2 of the optical lens 30 within the optical lens 30.

(9) Subsequently, the light is emitted from an emission region 34*b* corresponding to the incident region 33*b* to the outside of the optical lens 30.

(10) The irradiation region R35 corresponding to the peripheral light emitting part 55 is irradiated with the emitted light.

The light emitted from the peripheral light emitting part 55 may intersect the optical axis B2 of the optical lens 30 at a position other that the inside of the optical lens 30, and they may intersect at any appropriate positions from a position where the light is emitted from the peripheral light emitting part 55 to a position where the corresponding irradiation region R35 is irradiated with the light.

As described above, in the present embodiment, the twenty-five light emitting parts 41 and the irradiation regions corresponding to the respective light emitting parts 41 have the point-symmetric arrangement relationship with respect to the single point O above the central light emitting part 50. Thus, the peripheral unit light converging portion 85 is disposed such that its central axis C1 intersects the optical axis B2 of the optical lens 30 above the central light emitting part 50. The peripheral first unit lens 25 is disposed such that its optical axis B1 intersects the optical axis B2 of the optical lens 30 above the central light emitting part 50. Consequently, the light emitted from the light emitting part 41 has higher directivity toward the corresponding irradiation region R35, compared to when the peripheral unit light converging portion 85 and the peripheral first unit lens 25 are not provided.

It is noted that the central axis C1 of the peripheral unit light converging portion 85 may be parallel to the optical axis B1 of the peripheral first unit lens 25.

The shape of the incident region 33b (the incident region of the first optical lens 36) of the optical lens 30 which corresponds to the peripheral light emitting part 55 and the shape of the emission region 34b (the emission region of the third optical lens 38) of the optical lens 30 are appropriately designed so that the irradiation region R35 is irradiated with the light emitted from the peripheral first unit lens 25, the irradiation region R35 being disposed at the point-symmetric position to the peripheral light emitting part 55 with respect to the single point O.

Likewise, the shape of the emission region of the first optical lens 36, the shapes of the incident region and the emission region of the second optical lens 37, and the shape of the incident region of the third optical lens 38 are appropriately designed so that the irradiation region disposed at the point-symmetric position to the peripheral first unit lens with respect to the single point O is irradiated with the light emitted from the peripheral first unit lens.

As described above, the light source 1 according to the present embodiment includes the light converging member 70 disposed to cover the light emitting surfaces 41a of the light emitting parts 41 and the first lens 10 disposed to cover the light emission portions 72 of the light converging member 70, such that the amount of light per unit area emitted from the light emitting surface 41a of the light emitting part 41 is increased through the light converging member 70, and full-width half-maximum of the light is narrowed by the first lens 10 to have high directivity toward a corresponding irradiation region. The light having the high directivity towards the corresponding irradiation region enters the optical lens 30. Thus, the desired corresponding irradiation region can be efficiently irradiated with a sufficient amount of light emitted from the light emitting surface 41a of the light emitting part 41 at a sufficient brightness.

2. Second Embodiment

Figure 8:
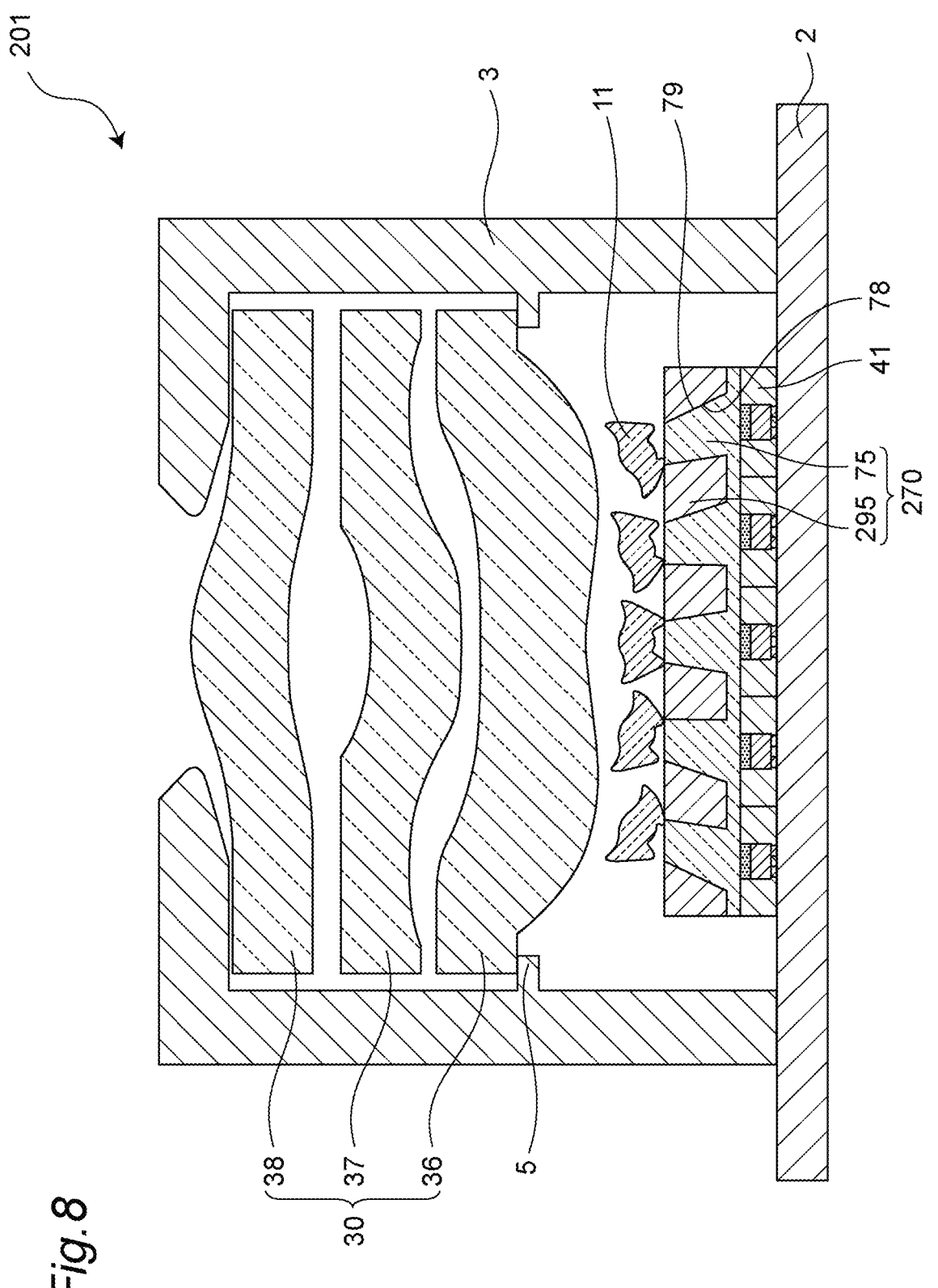
FIG. 8 is a schematic cross-sectional view of a light source for a flash according to a second embodiment of the present disclosure.

A light source 201 according to a second embodiment shown in FIG. 8 differs from the light source 1 according to the first embodiment in that an outer lateral surface 79 of the unit light converging portion 75 is covered with a second light-reflective member 295.

The second light-reflective member 295 is, for example, a white coating material formed of a white resin that contains a light diffusing material such as titanium oxide.

With the outer lateral surface 79 of the unit light converging portion 75 covered with the second light-reflective member 295, the light entering the unit light converging portion 75 can be totally reflected easily on the inner lateral surface 78 of the unit light converging portion 75, which allows for increasing the amount of light per unit area through the light converging member 270 more efficiently.

3. Third Embodiment

Figure 9:
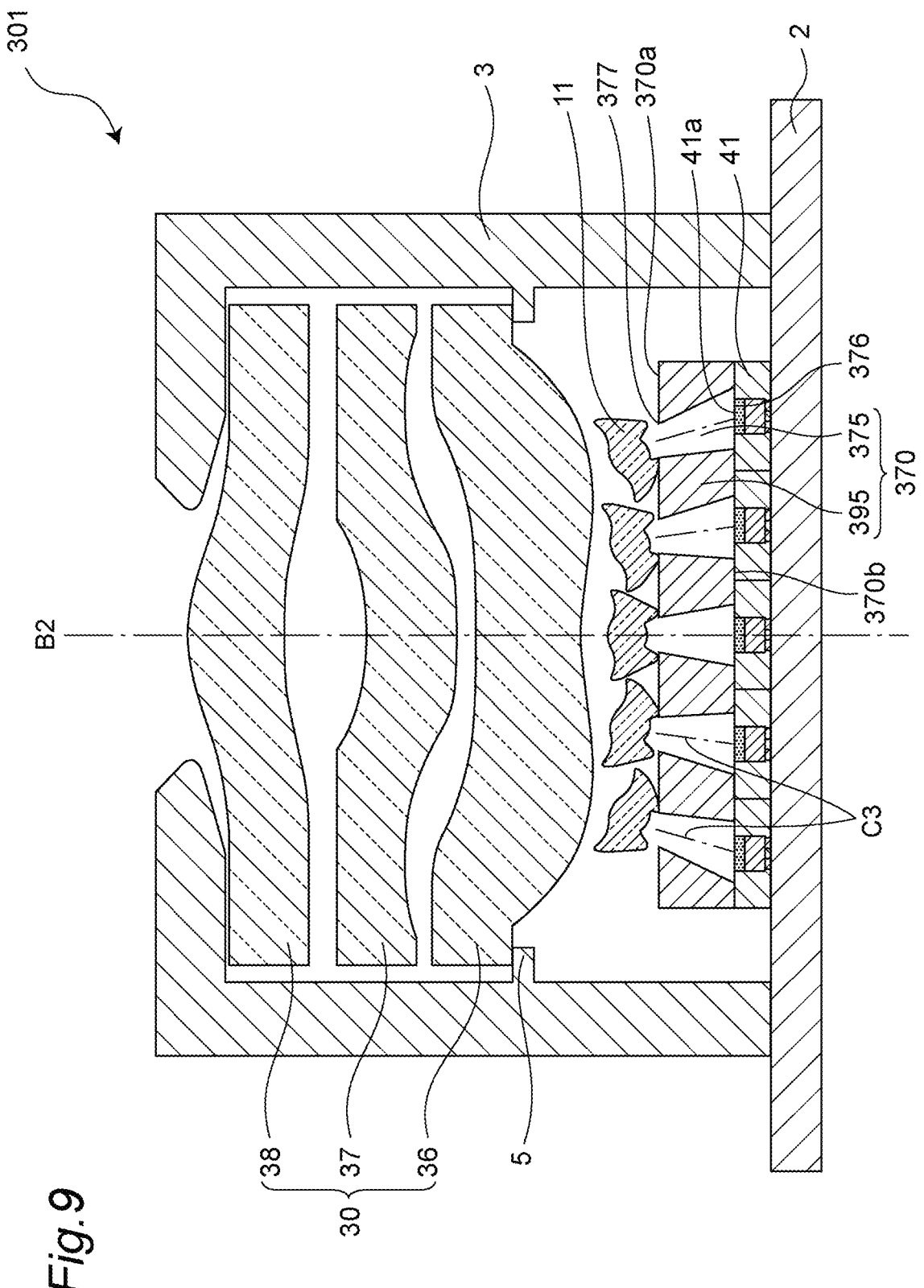
FIG. 9 is a schematic cross-sectional view of a light source for a flash according to a third embodiment of the present disclosure.

A light source 301 according to a third embodiment shown in FIG. 9 differs from the light source 1 according to the first embodiment in that a light converging member 370 includes a third light-reflective member 395 that has a plurality of cavities 375 each corresponding to a respective one of a plurality of light emitting parts, each cavity having a first opening on the light emitting part side and a second opening on the optical lens side.

In the present embodiment, a first light amount (light amount per unit area) $\phi1$ of light entering a corresponding cavity 375 through a first opening 376 is totally reflected within the corresponding cavity 375 and then a second light amount (light amount per unit area) $\phi2$ greater than the first light amount $\phi1$ of the reflected light is emitted through a second opening 377 to the outside of the corresponding cavity 375. Therefore, in the present embodiment, the cavities 375 serve as the unit light converging portions, the first openings 376 serve as the light entering portions, and the second openings 377 serve as the light emission portions.

Hereinafter, the light converging member 370 will be described below in detail.

The light converging member 370 has an upper surface 370a located on the optical lens 30 side and a lower surface 370b located on the light emitting part 41 side, and has an outer appearance of a substantially rectangular parallelepiped shape. The light converging member 370 is disposed over the twenty-five light emitting parts 41. The light converging member 370 is formed by providing the plurality of cavities 375 in the third light-reflective member 395 which is formed of, for example, a white resin containing a light diffusing material such as titanium oxide.

Each cavity 375 is a through hole having the second opening 377 on the upper surface 370a of the light converging member 370 and the first opening 376 on the lower surface 370b of the light converging member 370. Each of the cavities 375 corresponds to a respective one of the light emitting parts 41. Therefore, the light converging member 370 has the twenty-five cavities 375. Each cavity 375 is tapered from the first opening 376 to the second opening 377 such that an area of the first opening 376 is greater than an area of the second opening 377. The shape of each of the first opening 376 and the second opening 377 is, for example, a circle, a rectangle or other polygonal shapes.

As used herein, the term "opening" refers to an opening of a cavity 375 formed in a surface (upper surface 370a or lower surface 370b). The term "area of the opening" refers to an area of a region enclosed by an outline of the opening. The term "shape of the opening" refers to the shape of the region enclosed by the outline of the opening.

The shape and dimensions of the first opening 376 are determined such that the outline of the first opening 376 is located outward of the outer periphery of the light emitting surface 41a of the light emitting part 41 in a top plan view of the light source 301. This allows a light emitted from the light emitting surface 41a of a light emitting part 41 to efficiently enter a corresponding cavity 375.

While each cavity 375 is a space filled with air in the present embodiment, it may be filled with other substances. In this case, for other substance to fill the cavities 375, for example, a polycarbonate or a silicone resin can be used, and a substance whose refractive index is close to the refractive index of air is desirably used.

The central axis C3 of a cavity 375 connecting the midpoint of the first opening 376 and the midpoint of the second opening 377 may be disposed to be tilted with respect to the optical axis B2 of the optical lens 30, according to the arrangement relationship between the light emitting part 41 corresponding to the cavity 375 and the irradiation region corresponding to the light emitting part 41. In this case, the tilt angle of the central axis C3 with respect to the optical axis B2 of the optical lens 30 is a parameter that should be considered so as to set the shapes of the incident region 33 and the emission region 34 of the optical lens 30.

With the light converging member 370 formed of the third light-reflective member 395 defining the plurality of cavities 375, each cavity 375 having the first openings 376 on the light emitting part 41 side and the second openings 377 on the optical lens 30 side, the light absorption in the unit light converging portion (cavity 375) is reduced, compared to the unit light converging portion 75 which has been described above as the lens, allowing reduction of the loss of light.

VARIANT EXAMPLES

1. First Variant Example

Figure 10:
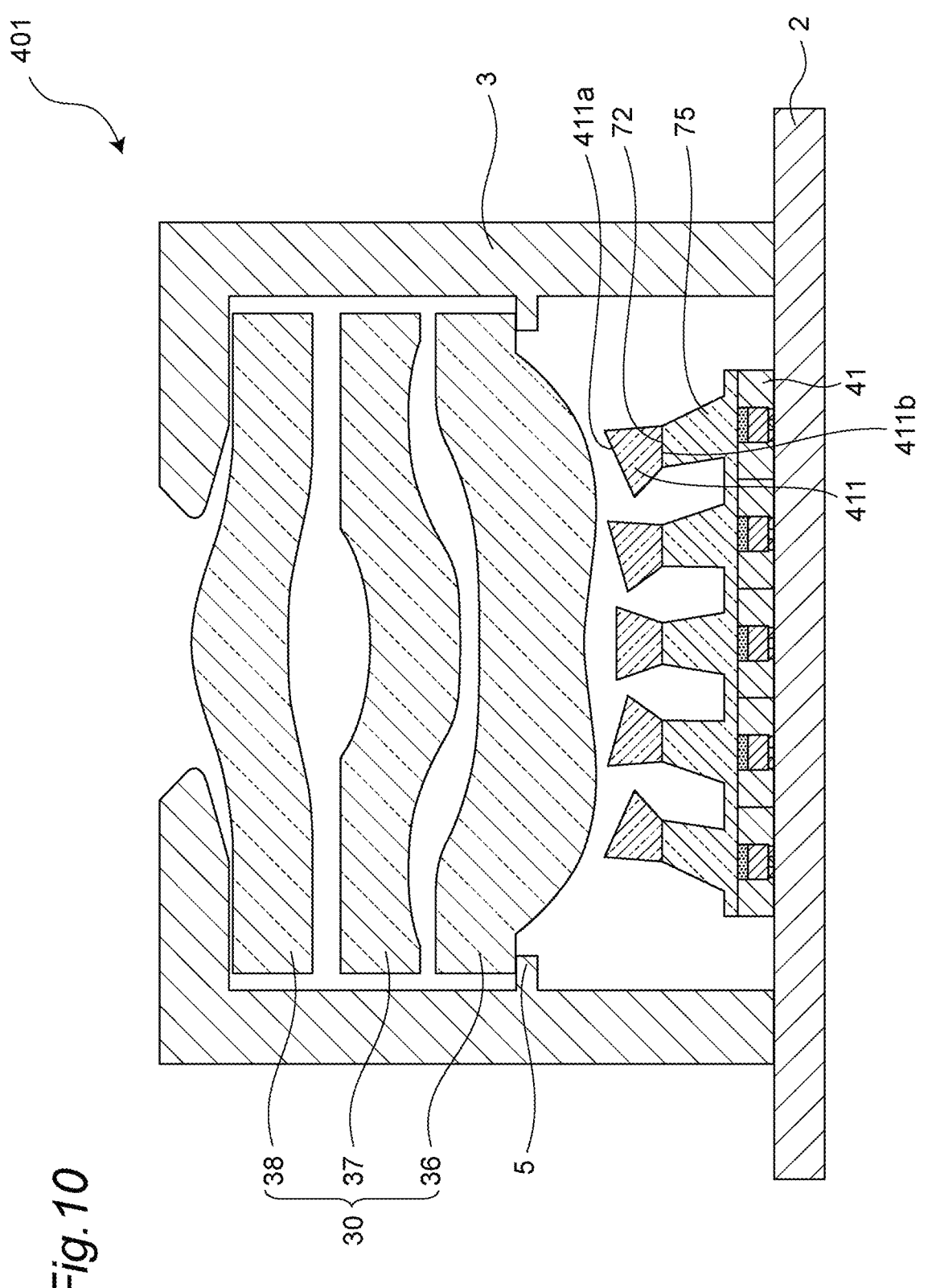
FIG. 10 is a schematic cross-sectional view of a light source for a flash according to a first variant example of the present disclosure.

A light source 401 according to a first variant example shown in FIG. 10 differs from the light sources according to the embodiments in that each first unit lens is a frustum lens in which an area of an upper surface 411a is greater than an area of a lower surface 411b. The first unit lens 411 according to the first variant example has the upper surface 411a and the lower surface 411b, each of which has the shape of, for example, a circle, a triangle, a rectangle, etc. Each first unit lens 411 is disposed with the lower surface 411b covering the light emission portion 72 of a corresponding unit light converging portion 75. The first unit lens 411 may be a lens other than a frustum lens in which the area of the upper surface 411a is greater than the area of the lower surface 411b, and may be a frustum lens in which the area of the upper surface 411a is smaller than the area of the lower surface 411b, or may be a columnar lens in which the area of the upper surface 411a is equal to the area of the lower surface 411b. Such a first unit lens 411 can adjust the directivity of light by utilizing the reflection inside the first unit lens 411 as in the total internal reflection lens described above.

Also, such a simple shape of the first unit lens 411 allows for facilitating producing a mold used for forming the first unit lens 411.

2. Second Variant Example

A light source of each of the present variant example and third to fifth variant examples to be described later differs from the light source 1 according to the embodiments in that the first lens is a lens collectively covering the light emission portions 72 of the plurality of unit light converging portions 75 and having at least one convex-shaped surface (convex surface) on the optical lens 30 side.

In a light source 501 according to the second variant example shown in FIG. 11, the first unit lens is a lens that has a single convex-shaped surface (convex surface) on the optical lens 30 side. The first unit lens 511 according to the second variant example has, for example, a semicircular cross-sectional shape with the convex surface 511a formed by a smooth curved surface. Further, the first unit lenses 511 are connected and monolithic with each other on the lower surface side. Therefore, the first lens 510 collectively covers the light emission portions 72 of the plurality of unit light converging portions 75 and includes a plurality of first unit lenses 511 corresponding to the respective light emission portions 72, each first unit lens 511 having the convex-shaped surface (convex surface) 511a on the optical lens 30 side.

Also, such a simple shape of the first unit lens 511 included in the first lens 510 allows for facilitating producing a mold used for forming the first unit lens 511. In such a light source 501, the plurality of first unit lenses 511 are formed monolithically together to form the single first lens 510, which eliminates the need to individually dispose the first unit lenses 511. That is, for example, all first unit lenses 511 can be disposed on the light converging member 70 by disposing the first lens 510 such that the optical axis B5 of the central first lens unit located at the center of the first lens 510 coincides with the optical axis B2 of the optical lens 30 or the central axis C1 of the central unit light converging portion 80. This can simplify the manufacturing process.

The first unit lens 511 as described above having a semicircular cross-sectional shape and including the convex surface 511a that is a smooth curved surface on the optical lens 30 side is not necessarily the monolithic single lens, but may be composed of separated members.

3. Third Variant Example

Figure 12:
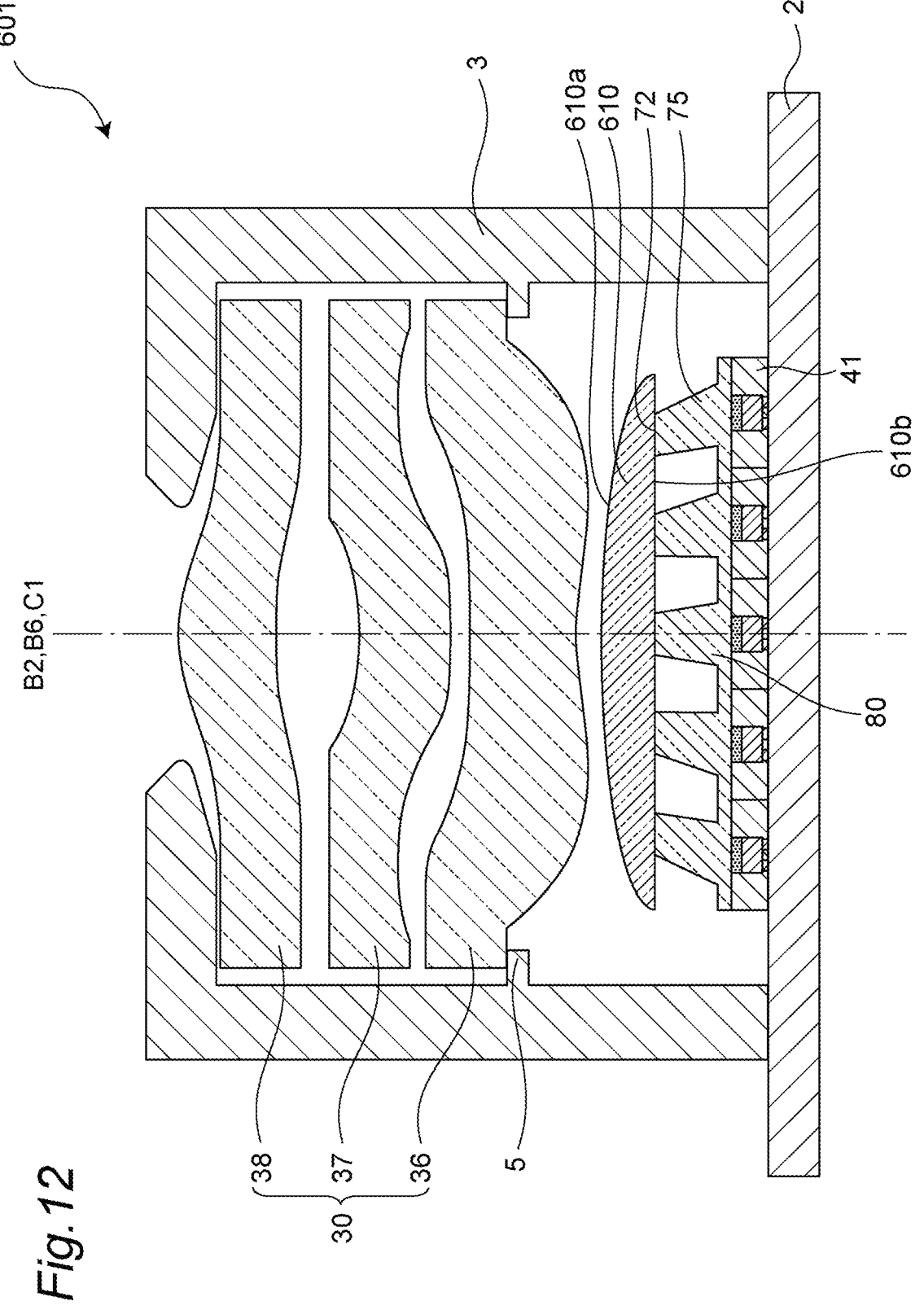
FIG. 12 is a schematic cross-sectional view of a light source for a flash according to a third variant example of the present disclosure.

A first lens 610 of a light source 601 according to a third variant example has a single convex-shaped surface (convex surface) 610a on the optical lens 30 side. As shown in FIG. 12, in the first lens 610, the convex surface 610a has a cross-section with an arc-shaped outline and is formed of a smooth curved surface.

Also, such a simple shape of the first lens 610 allows for facilitating producing a mold used for forming the first lens 610. When disposing such a first lens 610 on the plurality of unit light converging portions 75, for example, the optical axis B6 of the first lens 610 may be disposed on the optical axis B2 of the optical lens 30 or the central axis C1 of the central unit light converging portion 80. This can simplify the manufacturing process.

The curvature of the convex surface 610a of the first lens 610 may be constant from the optical axis B6 to the end of the first lens 610 or may vary according to the distance from the optical axis B6. In particular, by increasing the curvature of the convex surface 610a of the first lens 610 from the optical axis B6 to the end of the first lens 610, the following effects can be expected.

Among lights emitted from light emitting parts 41 (for example, in the present embodiment, the light emitting parts 41 disposed in the first row and the k-th column, in the fifth row and the k-th column, in the k-th row and the first column, and in the k-th row and the fifth column (k=1 to 5)), which are disposed near the ends of a convex surface 610a of the first lens 610, the light that deviates from the direction of a desired directivity (in the present embodiment, the direction toward the irradiation regions corresponding to these light emitting parts 41), in particular, the light oriented in the direction toward the frame 3 is less likely to be incident onto the optical lens 30. Consequently, the loss of light from these light emitting parts 41 may be increased. For this reason, with the curvature of the end of the convex surface 610a of the first lens 610 greater than the curvature of the central portion of the convex surface 610a, among the lights emitted from the light emitting parts 41 disposed near the ends of the convex surface 410*a*, the light directed to the frame 3 can be refracted in the direction of the desired directivity. This can reduce the loss of light from these light emitting parts 41.

4. Fourth Variant Example

Figure 13:
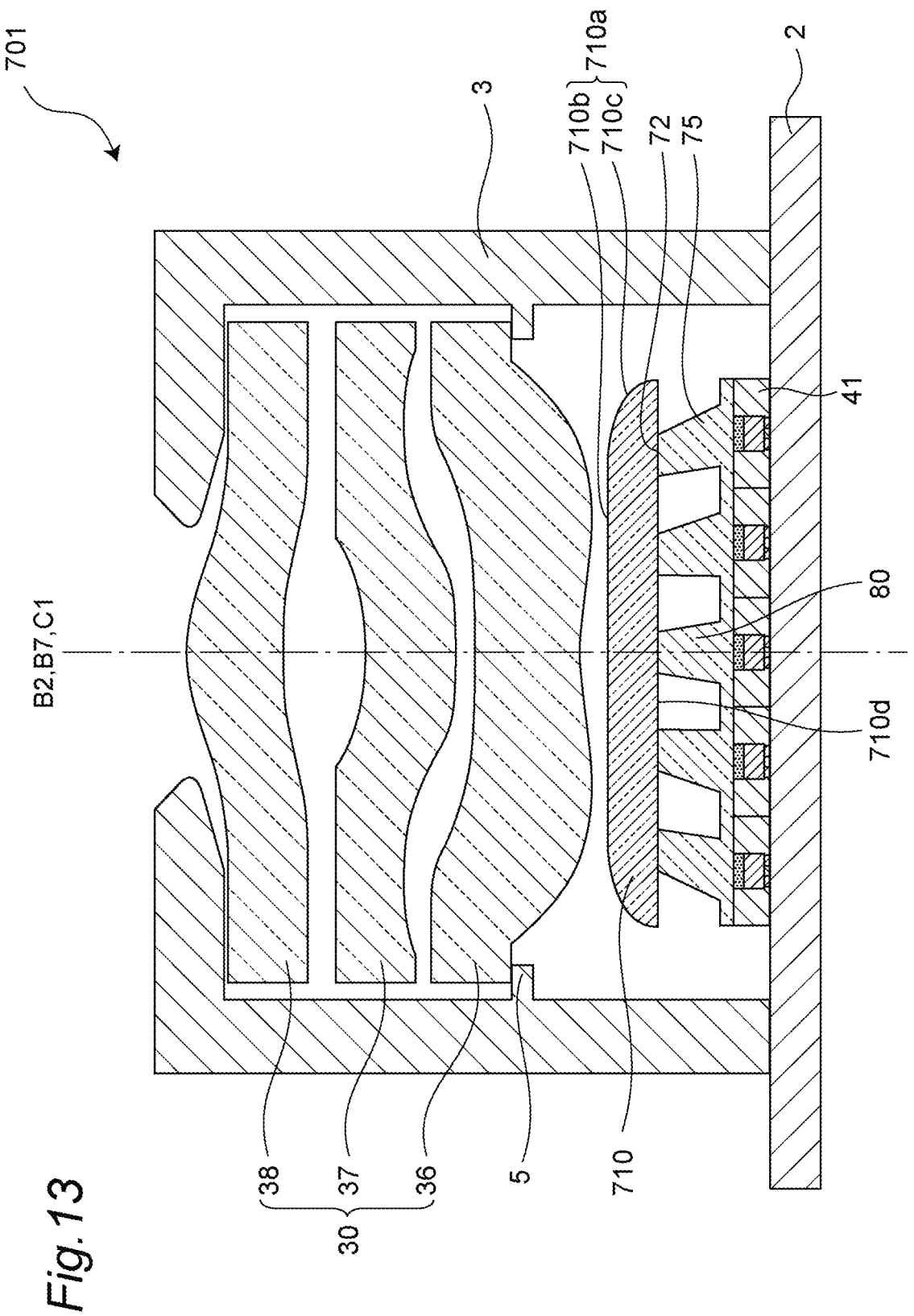
FIG. 13 is a schematic cross-sectional view of a light source for a flash according to a fourth variant example of the present disclosure.

A first lens 710 of a light source 701 according to a fourth variant example has a single convex-shaped surface (convex surface) 710*a* on the optical lens 30 side. As shown in FIG. 13, in the first lens 710, the convex surface 710*a* includes a flat portion 710*b* located in the center of the convex surface 710*a*, and a curved portion 710*c*, each connecting the flat portion 710*b* and a lower surface 710*d* of the first lens 710 and being located at the end of the first lens 710.

The flat portion 710*b* is orthogonal to the optical axis B2 of the optical lens 30. The curved surface 710*c* is curved toward the outside of the first lens 710. The first lens 710 is disposed to collectively cover the light emission portions 72 of all the unit light converging portions 75 with the lower surface 710*d*.

As described above about the light source 601 of the third embodiment, also in the light source 701 according to the present variant example, increasing the curvature of the end side of the first lens 710 in the curved surfaces 710*c* of the first lens 710 allows for refracting the lights emitted from the light emitting parts 41 disposed near the end portion of the first lens 710 in the direction of the desired directivity (in the present variant example, in the direction toward the irradiation region corresponding to these light emitting parts 41). This allows for reducing the loss of light from these light emitting parts 41. Furthermore, by making the center of the convex surface 710*a* of the first lens 710 flat, the first lens 710 can have its lens thickness thinner than the first lens having one convex curved surface across the entire optical lens 30 side, such as the light source 601 according to the third variant example, thereby making it possible to reduce the size of the light source.

Also, such a simple shape of the first lens 710 allows for facilitating producing a mold used for forming the first lens 710. When disposing such a first lens 710 on the plurality of unit light converging portions 75, for example, the optical axis B7 of the first lens 710 may be disposed on the optical axis B2 of the optical lens 30 or the central axis C1 of the central unit light converging portion 80. This can simplify the manufacturing process.

5. Fifth Variant Example

A first lens 810 of a light source 801 according to a fifth variant example has a single convex-shaped surface (convex surface) 810*a* on the optical lens 30 side.

Figure 14:
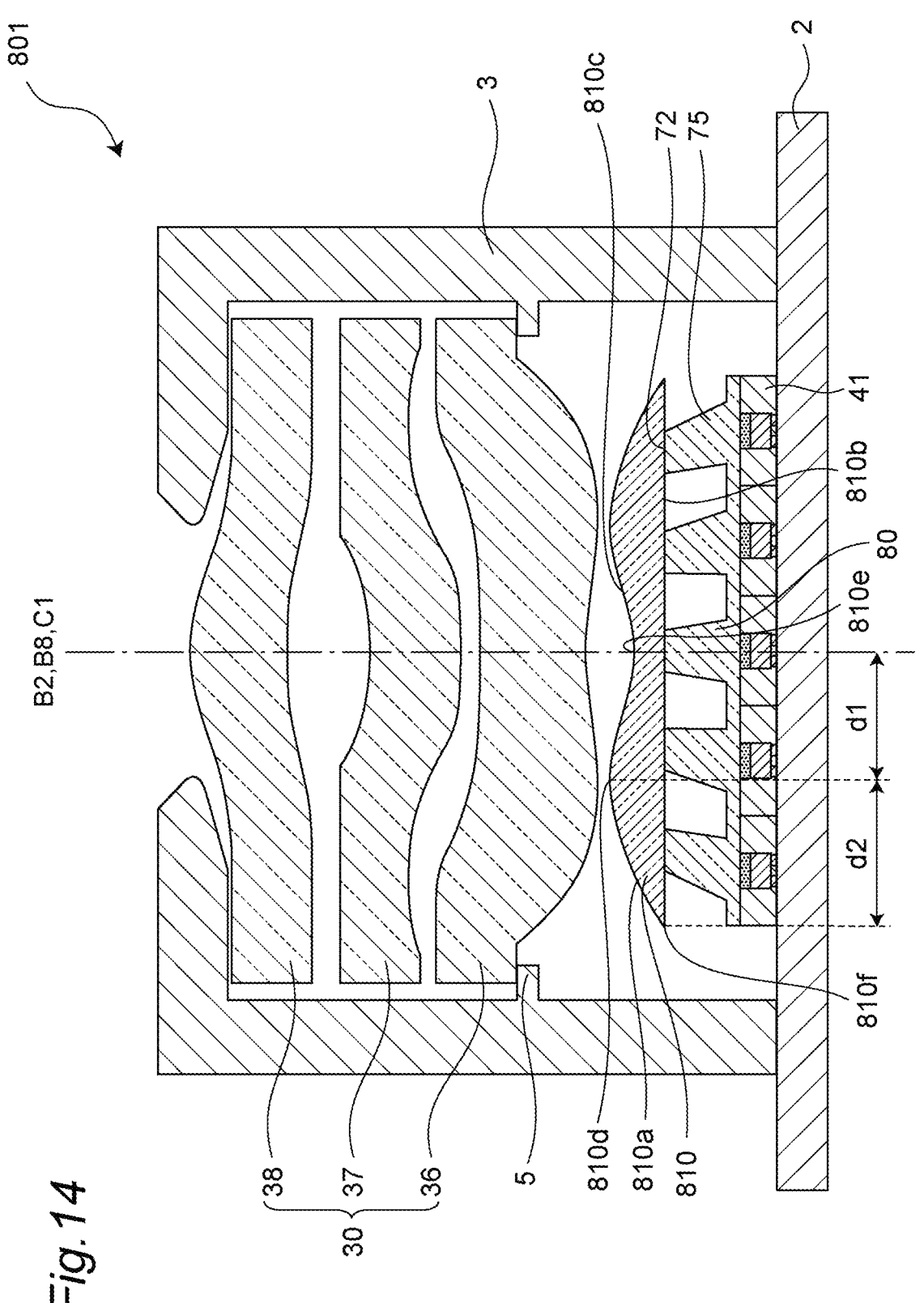
FIG. 14 is a schematic cross-sectional view of a light source for a flash according to a fifth variant example of the present disclosure.

As shown in FIG. 14, the convex surface 810*a* is a smoothly curved surface that has a cross section formed in an arc shape with the optical axis B8 of the first lens 810 centered. Therefore, in the cross-sectional shape of the first lens 810 through the optical axis B8, the convex surface 810*a* has two apex portions 810*d*. Each apex portion 810*d* of the convex surface 810*a* is desirably disposed at a position where a distance d1 from the apex portion 810*d* of the convex surface 810*a* to the optical axis B8 of the first lens 810 is shorter than a distance d2 from the apex portion 810*d* of the convex surface 810*a* to an outer circumferential edge 810*f* of the first lens 810. The center of the first lens 810 is formed in a concave surface 810*c* continuous to the convex surface 810*a*, while an apex portion 810*e* of the concave surface 810*c* is disposed on the optical axis B8 of the first lens 810. It is noted that the optical axis B8 of the first lens 810 is disposed so as to coincide with the optical axis B2 of the optical lens 30.

The end of the first lens 810 (in the present embodiment, the end of the convex surface 810*a*, in the vicinity of the outer circumferential edge 810*f*) preferably has a curvature greater than the curvature of the concave surface 810*c*.

The first lens 810 is disposed to collectively cover the light emission portions 72 of all the unit light converging portions 75 with the lower surface 810*b*. When disposing the first lens 810 on the plurality of unit light converging portions 75, for example, the optical axis B8 of the first lens 810 may be disposed on the optical axis B2 of the optical lens 30 or the central axis C1 of the central unit light converging portion 80. This can simplify the manufacturing process.

6. Sixth Variant Example

Figure 15:
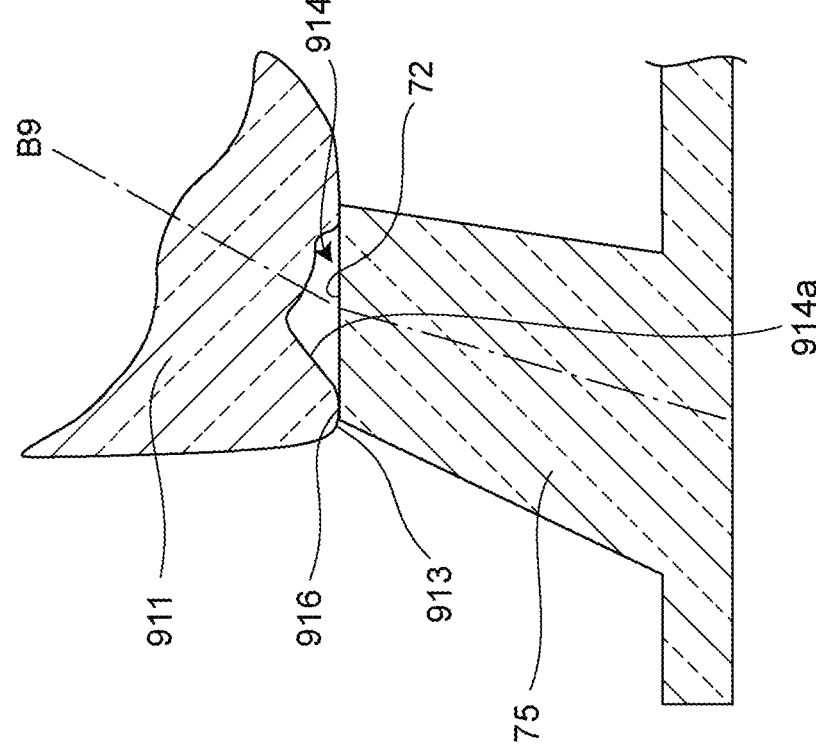
FIG. 15 is a schematic cross-sectional view of a unit light converging portion and a first unit lens, included in a light source for a flash according to a sixth variant example of the present disclosure.

As shown in FIG. 15, a light source according to a sixth variant example differs from the light sources according to the embodiments in that the first unit lens other than the central first unit lens is the total internal reflection lens with a rotationally asymmetric shape about its optical axis. A first unit lens 911 other than the central first unit lens according to the sixth variant example is the total internal reflection lens with a rotationally asymmetric shape about an optical axis B9, in which a connection portion 916 (an opening end of a recess 914) between a lower surface 913 and an inner surface 914*a* of the recess 914 provided on the lower surface 913 is formed to contact the light emission portion 72. That is, the light emission portion 72 of the unit light converging portion 75 is covered with the inner surface 914*a* of the recess 914 of the first unit lens 911, the inner surface 914*a* being provided to face the light emission portion 72 of the unit light converging portion 75, where the first unit lens 911 is the total internal reflection lens. With the use of such a first unit lens 911, the light emitted from the unit light converging portion 75 enters the first unit lenses 911 through the inner surface 914*a* of the recess 914 of the first unit lens 911 without leaking from between the unit light converging portion 75 and the first unit lens 911. This can increase the efficiency of usage of the light emitted from the light emitting part 41.

The tilt angle of the first unit lens 911 with respect to the optical axis B2 of the optical lens 30 varies depending on in which row and column the corresponding light emitting part is disposed within a matrix with five rows and five columns. Thus, the shape of the first unit lens 911 differs according to each light emitting part 41.

It is noted that in the present embodiment, the twenty-five light emitting parts 41 and the irradiation regions corresponding to the respective light emitting parts 41 have the point-symmetric arrangement relationship with respect to the single point O above the central light emitting part 50.

Therefore, the point-symmetric arrangement relationship has the following features:

(1) the first unit lens 911 disposed in the third row and the second column and the first unit lens 911 disposed in the third row and the fourth column have the same shape (shape 1);

(2) the first unit lens 911 disposed in the second row and the third column and the first unit lens 911 disposed in the fourth row and the third column have the same shape (shape 2);

(3-1) the first unit lens 911 disposed in the second row and the second column and the first unit lens 911 disposed in the fourth row and the fourth column have the same shape (shape 3-1);

(3-2) the first unit lens 911 disposed in the second row and the fourth column and the first unit lens 911 disposed in the fourth row and the second column have the same shape (shape 3-2);

(4) the first unit lens 911 disposed in the third row and the first column and the first unit lens 911 disposed in the third row and the fifth column have the same shape (shape 4);

(5) the first unit lens 911 disposed in the first row and the third column and the first unit lens 911 disposed in the fifth row and the third column have the same shape (shape 5);

(6-1) the first unit lens 911 disposed in the second row and the first column and the first unit lens 911 disposed in the fourth row and the fifth column have the same shape (shape 6-1);

(6-2) the first unit lens 911 disposed in the second row and the fifth column and the first unit lens 911 disposed in the fourth row and the first column have the same shape (shape 6-2);

(7-1) the first unit lens 911 disposed in the first row and the second column and the first unit lens 911 disposed in the fifth row and the fourth column have the same shape (shape 7-1);

(7-2) the first unit lens 911 disposed in the first row and the fourth column and the first unit lens 911 disposed in the fifth row and the second column have the same shape (shape 7-2);

(8-1) the first unit lens 911 disposed in the first row and the first column and the first unit lens 911 disposed in the fifth row and the fifth column have the same shape (shape 8-1); and (8-2) the first unit lens 911 disposed in the first row and the fifth column and the first unit lens 911 disposed in the fifth row and the first column have the same shape (shape 8-2).

Furthermore, in a case in which the shape of the light emitting part 41 in the top view is square and the dimensions of the light emitting surfaces 41a of the respective light emitting parts 41 are the same, the shape 1 and the shape 2 are the same, the shape 4 and the shape 5 are the same, the shape 6-1, the shape 6-2, the shape 7-1, and the shape 7-2 are all the same, the shape 3-1 and the shape 3-2 are the same shape, and the shape 8-1 and the shape 8-2 are the same.

7. Seventh Variant Example

Figure 16:
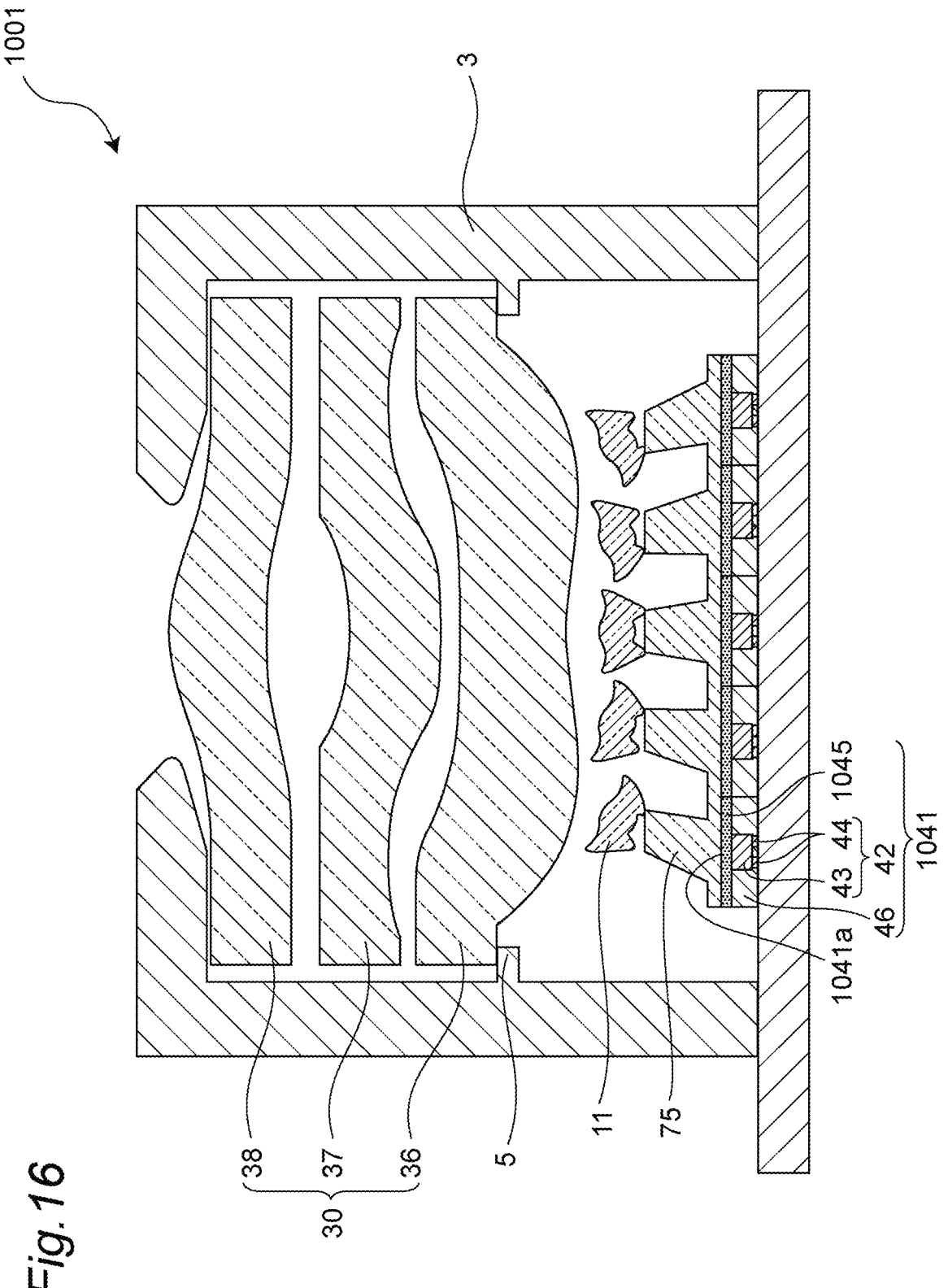
FIG. 16 is a schematic cross-sectional view of a light source for a flash according to a seventh variant example of the present disclosure.

A light source 1001 according to a seventh variant example shown in FIG. 16 differs from the light sources according to the embodiments in that a wavelength conversion member provided in the light emitting part is disposed to cover an upper surface of the light emitting element 42 and an upper surface of the light-reflective member 46. A wavelength conversion member 1045 according to the seventh variant example may be provided for each light emitting part 41, or it may be a single member that collectively covers the upper surfaces of the light emitting elements 42 and the upper surfaces of the light-reflective members 46 provided in all twenty-five light emitting parts 1041.

With the wavelength conversion member 1045 that is a thin member, when the wavelength conversion member 1045 is disposed to cover the upper surfaces of the light emitting elements 42 and the upper surfaces of the light-reflective members 46 in this arrangement, a light emitting surface 1041a of the light emitting part 1041 can be regarded as a region of the wavelength conversion member 1045 located directly above the upper surface of the light emitting element 42.

Other Variant Examples

Figure 17:
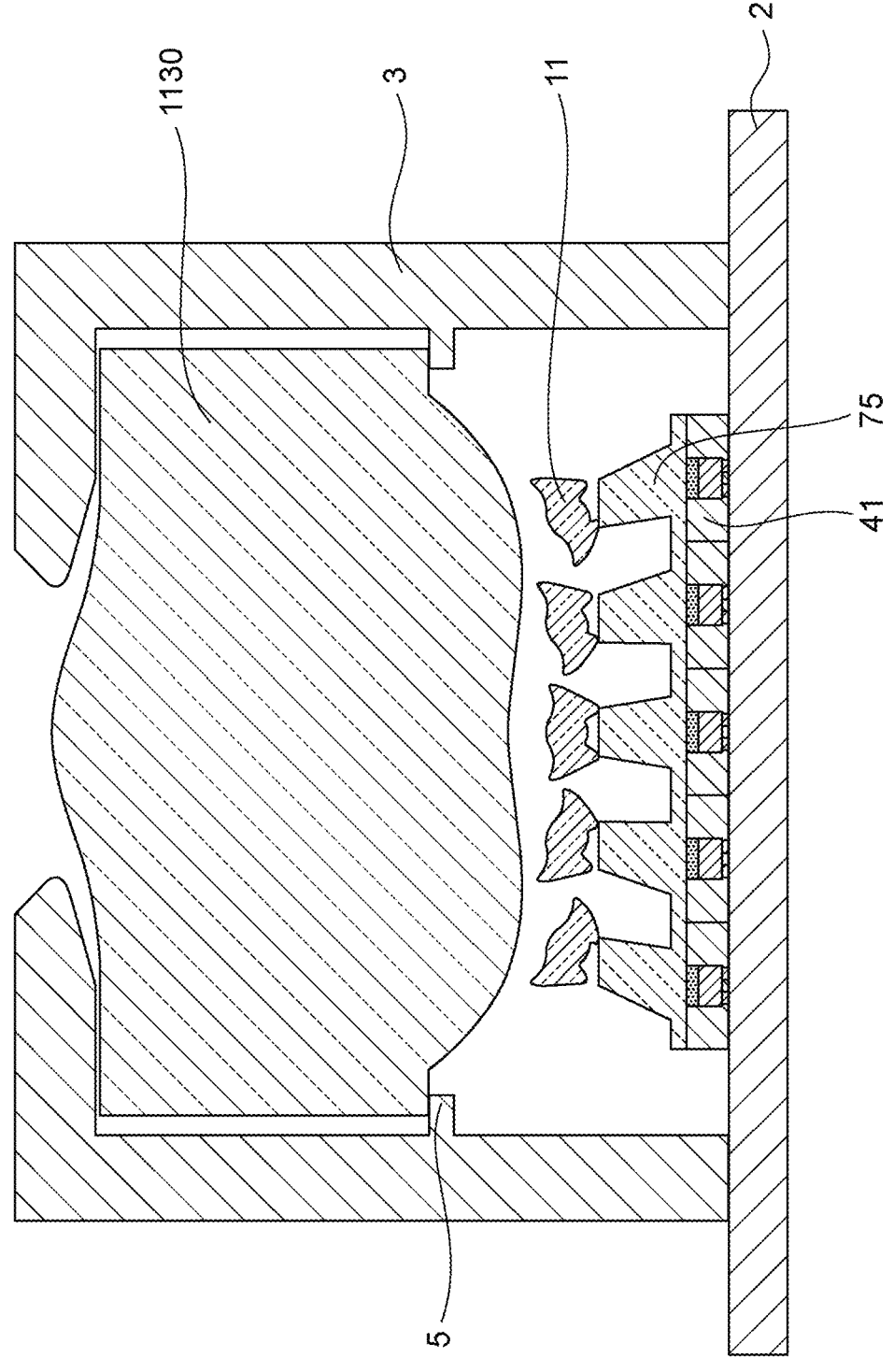
FIG. 17 is a schematic cross-sectional view of a light source for a flash according to another variant example of the present disclosure.
Figure 18:
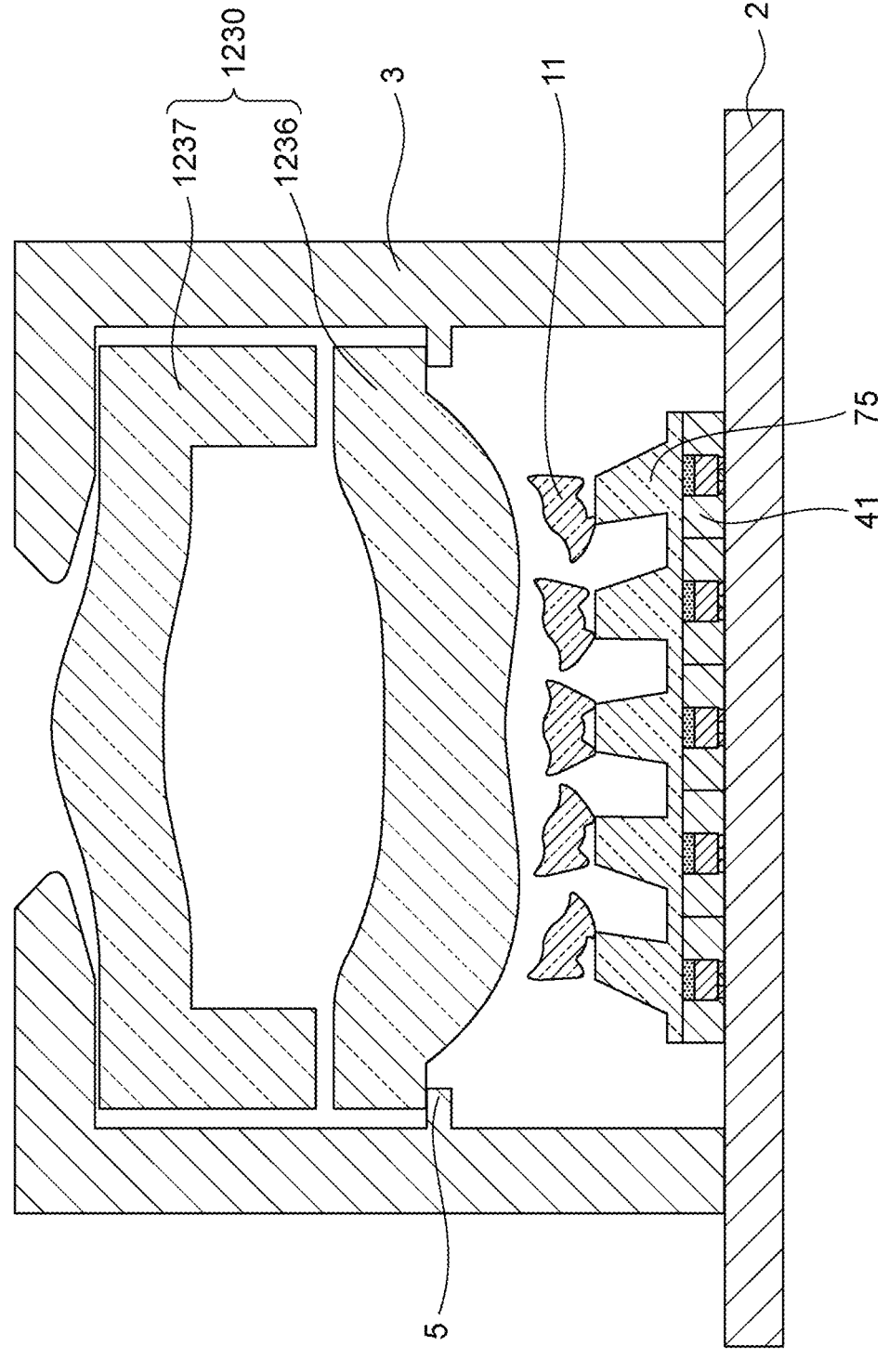
FIG. 18 is a schematic cross-sectional view of a light source for a flash according to another variant example of the present disclosure.

While the optical lens 30 is composed of three lenses, namely, the first optical lens 36, the second optical lens 37, and the third optical lens 38 in the light sources according to the embodiments described above and variant examples described above, the optical lens may be composed of another number of lenses. For example, as shown in FIG. 17, an optical lens 1130 may be composed of a single lens. For example, as shown in FIG. 18, an optical lens 1230 may be composed of two lenses, namely, a first optical lens 1236 and a second optical lens 1237. For example, the optical lens may be composed of four or more lenses.

Figure 19:
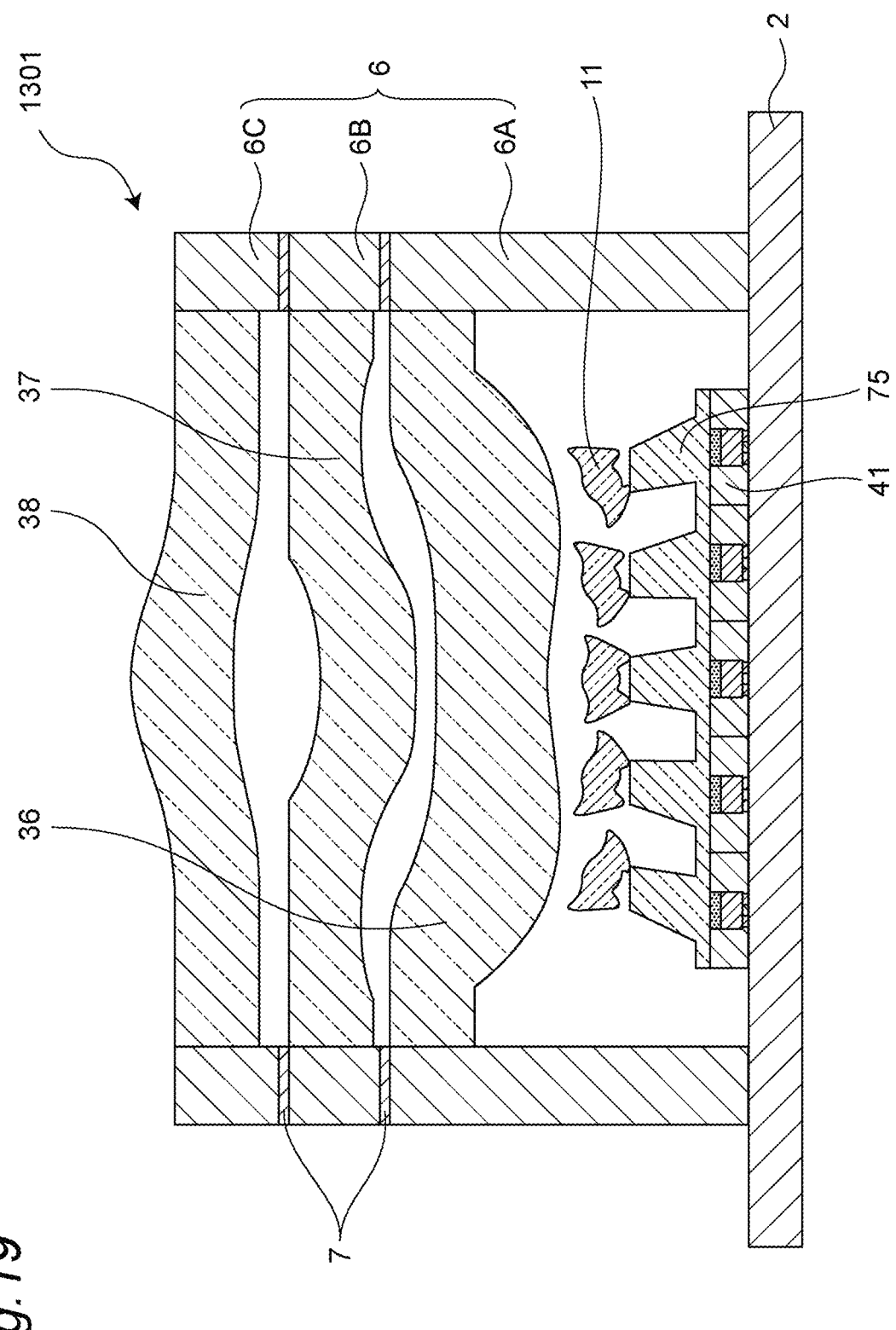
FIG. 19 is a schematic cross-sectional view of a light source for a flash according to another variant example of the present disclosure.

Although the light sources according to the above-described embodiments and variant examples support the optical lens by using the supporting portion 5 provided on the inner surface of the frame 3, other configurations may be employed for supporting the optical lens. For example, as shown in FIG. 19, the first optical lens 36, the second optical lens 37, and the third optical lens 38 may be supported by a first leg 6A, a second leg 6B, and a third leg 6C connected to the ends of the first optical lens 36, the second optical lens 37, and the third optical lens 38, respectively.

The first leg 6A extends from the end of the first optical lens 36 to the upper surface 2a of the substrate 2 to support the first optical lens 36. The second leg 6B extends from the end of the second optical lens 37 to the upper surface of the first leg 6A, to support the second optical lens 37. The third leg 6C extends from the end of the third optical lens 38 to the upper surface of the second leg 6B to support the third optical lens 38.

The first leg 6A, the second leg 6B, and the third leg 6C may be formed from, for example, the light-reflective member or a light shielding member. For example, the first leg 6A, the second leg 6B, and the third leg 6C may be parts of lenses which are formed of the same material as that of the first optical lens 36, the second optical lens 37, and the third optical lens 38, respectively. In this case, for a joint member 7 joining the first leg 6A, the second leg 6B, and the third leg 6C, for example, an adhesive or the like may be used.

Alternatively, the first leg 6A, the second leg 6B, and the third leg 6C may be composed of a single monolithic member.

It is noted that in a case in which each optical lens is supported by a leg connected to the end of each optical lens in this way, the light source may not include a frame.

While the embodiments, variant examples, and Examples of the present disclosure have been described above, the contents of the disclosure may be modified regarding the details of components, and combinations of elements, changes in order, and the like in the embodiments, variant examples, and Examples may be achieved without departing from the scope and idea of the claimed present disclosure.

The light source device according to certain embodiments of the present invention can be used to irradiate light to desired irradiation region, and thus can be appropriately used for lights, camera flashes, car headlights, etc. The light source device according to certain embodiments of the present invention can be used for other applications.

What is claimed is:

1. A light source device comprising:
a plurality of light emitting parts, each having an upper surface that comprises a light emitting surface;
an optical lens located above the light emitting surfaces of the light emitting parts, the optical lens having:
  a first surface comprising a first incident region, and
  a second surface comprising a second incident region; and
a light converging member located between the light emitting parts and the optical lens, the light converging member comprising:
  a light entering portion, corresponding to a first of the plurality of light emitting parts and covering the light emitting surface of the first light emitting part, and
  a light emission portion, corresponding to the light entering portion;
  wherein the light converging member comprises a first light-reflective member and a unit light converging portion having the light entering portion and the light emission portion, wherein at least a lateral side of the unit light converging portion is covered with or defined by the first light-reflective member.

2. The light source device according to claim 1, wherein the light converging member is bonded with at least the first light emitting part.

3. The light source device according to claim 1, wherein the light converging member is a monolithic single member formed by the first light-reflective member.

4. The light source device according to claim 3, wherein the first light emitting part comprises a light emitting element, a wavelength conversion member covering an upper surface of the light emitting element, and a second light-reflective member covering lateral surfaces of the light emitting element and lateral surfaces of the wavelength conversion member, and wherein the second light-reflective member is bonded with the monolithic single member.

5. The light source device according to claim 1, wherein the first light emitting part comprises a light emitting element, a wavelength conversion member covering an upper surface of the light emitting element, and a second light-reflective member covering lateral surfaces of the light emitting element and lateral surfaces of the wavelength conversion member, and wherein the second light-reflective member is bonded with the first light-reflective member.

6. The light source device according to claim 1, wherein the first light emitting part comprises a light emitting element, and a second light-reflective member covering lateral surfaces of the light emitting element, and the light source device comprises a wavelength conversion member that continuously covers an upper surface of the light emitting element and an upper surface of the second light-reflective member.

7. The light source device according to claim 1, wherein the plurality of light emitting parts are arranged in a matrix, and wherein a size of a light emitting surface of a light emitting part located at a center of the matrix differs from a size of a light emitting surface of a light emitting part located at a corner of the matrix.

8. The light source device according to claim 1, wherein the plurality of light emitting parts are arranged in a matrix, and wherein a size of a light emitting surface of a light emitting part located at a center of the matrix is larger than a size of a light emitting surface of a light emitting part located at a corner of the matrix.

9. The light source device according to claim 1, wherein the plurality of light emitting parts are arranged in a matrix, and wherein a size of a light emitting surface of a light emitting part located at a corner of the matrix is larger than a size of a light emitting surface of a light emitting part located at a center of the matrix.

10. The light source device according to claim 1, wherein an area of the light emission portion is smaller than an area of the light entering portion.

11. The light source device according to claim 1, wherein the unit light converging portion is a frustum lens, having an upper surface and a lower surface and covering the light emitting surface of the first light emitting part, wherein the lower surface of the frustum lens serves as the light entering portion, wherein the upper surface of the frustum lens serves as the light emission portion.

12. The light source device according to claim 1, wherein the unit light converging portion is a cavity, having a first opening on a light emitting part side and a second opening on an optical lens side, wherein the first opening of the cavity serves as the light entering portion, and wherein the second opening of the cavity serves as the light emission portion.

13. The light source device according to claim 1, further comprising:
a first lens that covers the light emission portion of the light converging member, wherein a light emitted from the light emission portion of the light converging member enters the first lens at a first full-width half-maximum, is emitted from the first lens at a second full-width half-maximum smaller than the first full-width half-maximum, and enters the optical lens.

14. The light source device according to claim 13, wherein the first lens covers the light emission portion and has at least one convex surface on an optical lens side.

15. The light source device according to claim 1, wherein each of the light emitting parts and each of irradiation regions that correspond to the each of the respective light emitting parts are in a point-symmetric arrangement relationship.

16. The light source device according to claim 1, wherein the plurality of light emitting parts are arranged in a matrix of m rows and n columns.

17. The light source device according to claim 1, wherein at least some of the plurality of light emitting parts are configured to be individually turned on.

18. A camera flash comprising the light source device according to claim 1.

* * * * *